United States Patent
Ikegami

(10) Patent No.: US 10,419,363 B2
(45) Date of Patent: Sep. 17, 2019

(54) NETWORK DEVICE, COMMUNICATION METHOD, AND RECORDING MEDIUM

(71) Applicant: ALLIED TELESIS HOLDINGS K.K., Shinagawa-ku, Tokyo (JP)

(72) Inventor: Tokunori Ikegami, Tokyo (JP)

(73) Assignee: ALLIED TELESIS HOLDINGS K.K., Tokyo (JP)

( * ) Notice: Subject to any disclaimer, the term of this patent is extended or adjusted under 35 U.S.C. 154(b) by 733 days.

(21) Appl. No.: 14/825,616

(22) Filed: Aug. 13, 2015

(65) Prior Publication Data
US 2016/0065502 A1 Mar. 3, 2016

(30) Foreign Application Priority Data

Aug. 29, 2014 (JP) ................................. 2014-175039

(51) Int. Cl.
*H04L 12/935* (2013.01)
*H04L 12/937* (2013.01)

(52) U.S. Cl.
CPC ............ *H04L 49/30* (2013.01); *H04L 49/254* (2013.01)

(58) Field of Classification Search
CPC ...................................................... H04L 12/00
See application file for complete search history.

(56) References Cited

U.S. PATENT DOCUMENTS

| 6,765,877 | B1 * | 7/2004 | Foschiano | H04L 45/02 370/242 |
| 2003/0021235 | A1 * | 1/2003 | Arima | H04L 43/50 370/244 |
| 2006/0285487 | A1 * | 12/2006 | Yasuie | H04L 41/0681 370/216 |
| 2006/0285499 | A1 * | 12/2006 | Tzeng | H04L 45/00 370/249 |
| 2008/0267081 | A1 * | 10/2008 | Roeck | H04L 47/10 370/249 |
| 2009/0207742 | A1 | 8/2009 | Suzuyama et al. | |
| 2009/0219821 | A1 | 9/2009 | Kamachi et al. | |
| 2009/0282145 | A1 * | 11/2009 | Niimi | H04L 12/4625 709/224 |
| 2009/0296728 | A1 * | 12/2009 | Srinivasan | H04L 12/4625 370/402 |

(Continued)

FOREIGN PATENT DOCUMENTS

| JP | 11-191782 | 7/1999 |
| JP | 2003-037613 A | 2/2003 |

(Continued)

OTHER PUBLICATIONS

Japanese Office Action issued for Japanese Application No. 2014-175039 dated Mar. 1, 2018.

*Primary Examiner* — Alpus Hsu
*Assistant Examiner* — Camquyen Thai
(74) *Attorney, Agent, or Firm* — Greenblum & Bernstein, P.L.C.

(57) ABSTRACT

According to the present invention, a network device having a plurality of ports, includes a linkup detection unit, a loop detection unit, and a communication shutoff unit. The linkup detection unit detects a linkup of the each port. The loop detection unit detects a loop formed by the network device. The communication shutoff unit shuts off communication on a port on which the linkup was detected at a later time point if the loop is detected.

7 Claims, 21 Drawing Sheets

(56) References Cited

U.S. PATENT DOCUMENTS

| | | | |
|---|---|---|---|
| 2011/0134760 A1 | 6/2011 | Kamachi et al. | |
| 2013/0016627 A1* | 1/2013 | Higashihara | H04L 12/4625 370/254 |
| 2014/0192632 A1* | 7/2014 | Sait | H04L 45/18 370/219 |
| 2014/0204768 A1* | 7/2014 | Chen | H04L 43/10 370/244 |
| 2014/0269343 A1* | 9/2014 | Nagatsuka | H04L 41/064 370/242 |
| 2014/0317437 A1* | 10/2014 | LeFevre | G06F 11/2033 714/4.11 |

FOREIGN PATENT DOCUMENTS

| | | |
|---|---|---|
| JP | 2005-086762 A | 3/2005 |
| JP | 2006-238305 | 9/2006 |
| JP | 2009-117899 | 5/2009 |
| JP | 2009-118253 A | 5/2009 |
| JP | 2009-194752 | 8/2009 |
| JP | 2009-207028 | 9/2009 |

\* cited by examiner

NETWORK DEVICE, COMMUNICATION METHOD, AND RECORDING MEDIUM

BACKGROUND OF THE INVENTION

1. Field of the Invention

The present invention relates to dissolution of a loop relating to a network device (such as a switch).

2. Related Art

When a network device is connected incorrectly, a loop may be generated.

FIG. 20 is diagrams showing an example of a network configuration in which a loop is generated according to prior art, and showing an example (FIG. 20(a)) of the network configuration before a loop is generated and an example (FIG. 20(b)) of the network configuration after the loop is generated.

Referring to FIG. 20(a), a port 101 of the switch 100 and a port 201 of a hub 200 are correctly connected with each other. It should be noted that the switch 100 includes ports 102 and 103 in addition to the port 101, and the hub 200 includes ports 202 and 203 in addition to the port 201.

However, referring to FIG. 20(b), the port 103 of the switch 100 and the port 203 of the hub 200 are incorrectly connected with each other. In this case, a loop is generated.

For example, a frame output (broadcasted) from the port 101 is output via the port 201 and the hub 200 from the port 203. Further, the frame output from the port 203 is output via the port 103 and the switch 100 from the port 101.

For example, a frame output (broadcasted) from the port 103 is output via the port 203 and the hub 200 from the port 201. Further, the frame output from the port 201 is output via the port 101 and the switch 100 from the port 103.

When a loop is generated in this way, a communication is interfered. It is thus known that a loop is detected by means of a loop detection frame (LDF), thereby dissolving the loop.

FIG. 21 is a diagram showing a detection principle of a loop by means of the LDF according to prior art, and shows a case in which the LDF is output from the port 101 (FIG. 21(a)), and a case in which the LDF is output from the port 103 (FIG. 21(b)).

Referring to FIG. 21(a), when the LDF is output from the port 101, the LDF is output via the port 201 and the hub 200 from the port 203. Further, the LDF output from the port 203 is received at the port 103.

Referring to FIG. 21(b), when the LDF is output from the port 103, the LDF is output via the port 203 and the hub 200 from the port 201. Further, the LDF output from the port 201 is received at the port 101.

On this occasion, while the LDF is periodically (such as at an interval of 1 second) output from the each port of the switch 100, and if the LDF is detected at any port of the switch 100, it can be determined that a loop is generated. If the switch 100 determines that a loop is generated, the loop can be dissolved by shutting off a communication on a port (at least one port of ports 101 and 103) relating to the loop generation.

PRIOR ART DOCUMENTS

[Patent Document 1] JP 2009-194752 A
[Patent Document 2] JP 2009-207028 A
[Patent Document 3] JP 2009-117899 A
[Patent Document 4] JP 2006-238305 A
[Patent Document 5] JP Hei11(1999)-191782A

SUMMARY OF THE INVENTION

However, if the switch 100 is configured to shut off the communication on the ports (at least one of the ports 101, and 103) relating to the loop generation, the communication on the ports 101 and 103 can be shut off, or the communication on the port 101 can be shut off.

If the communication on the ports 101 and 103 is shut off, the communication between the switch 100 and the hub 200 cannot be carried out.

If the communication on the port 101 is shut off, the communication between the switch 100 and the hub 200 is carried out via the port 103. However, setting for the communication on the port 103 connected incorrectly may be different from setting for the communication on the port 101 connected correctly. Therefore, the communication via the port 103 is not guaranteed.

It is therefore an object of the present invention to enable communication on a port correctly connected between network devices when a loop is dissolved.

According to the present invention, a network device having a plurality of ports, includes: a linkup detection unit that detects a linkup of the each port; a loop detection unit that detects a loop formed by the network device; and a communication shutoff unit that shuts off communication on a port on which the linkup was detected at a later time point if the loop is detected.

According to the thus constructed network device, a network device including a plurality of ports can be provided. A linkup detection unit detects a linkup of the each port. A loop detection unit detects a loop formed by the network device. A communication shutoff unit shuts off communication on a port on which the linkup was detected at a later time point if the loop is detected.

According to the present invention, the network device may include a linkup time point recording unit that records a detection time point of the linkup on the port while the detection time point is associated with a linkup detected port, which is the port on which the linkup was detected, wherein the communication shutoff unit may shut off the communication based on the recorded content of the linkup time point recording unit.

According to the present invention, the network device may include a detection period recording unit that records a detection period from the detection of the linkup on the port until the detection of the loop while the detection period is associated with a linkup detected port, which is the port on which the linkup was detected, wherein the communication shutoff unit may shut off the communication on a linkup detected port corresponding to a shorter detection period out of the detection periods recorded in the detection period recording unit.

According to the present invention, the network device may include a loop detection frame sending out unit that sends out a loop detection frame, wherein the loop detection unit may detect the loop detection frame to detect the loop.

According to the network device of the present invention, the loop detection frame sending out unit may send out the loop detection frame from the linkup detected port, which is the port on which the linkup was detected, after a predetermined period from the time point when the linkup was detected by the linkup detection unit, another network device may be connected to the network device, and the predetermined period may be longer than a difference between a period required for the network device to detect the linkup and a period required for the other network device to detect the linkup.

According to the network device of the present invention, the communication on the linkup detected port may be shut off from a time point before a time point when the linkup is detected on the other network device until the loop detection frame is sent out from the network device.

According to the network device of the present invention, the communication on the linkup detected port may be shut off from a time point when the linkup is detected on the network device until the loop detection frame is sent out from the network device.

According to the network device of the present invention, the loop detection unit may detect the loop based on a reception rate on the port.

According to the present invention, the network device may include an address recording unit that records a MAC address of a transmission source of a frame received by the port while the MAC address is associated with the port which has received the frame, wherein the loop detection unit detects the loop based on a change rate of the recorded content of the address recording unit.

The present invention is a communication method with using a network device including a plurality of ports, including: a linkup detection step that detects a linkup of the each port; a loop detection step that detects a loop formed by the network device; and a communication shutoff step that shuts off communication on a port on which the linkup was detected at a later time point if the loop is detected.

The present invention is a program of instructions for execution by a computer to perform a communication process with using a network device including a plurality of ports, the process including: a linkup detection step that detects a linkup of the each port; a loop detection step that detects a loop formed by the network device; and a communication shutoff step that shuts off communication on a port on which the linkup was detected at a later time point if the loop is detected.

The present invention is a non-transitory computer-readable medium having a program of instructions for execution by a computer to perform a communication process with using a network device including a plurality of ports, the process including: a linkup detection step that detects a linkup of the each port; a loop detection step that detects a loop formed by the network device; and a communication shutoff step that shuts off communication on a port on which the linkup was detected at a later time point if the loop is detected.

DESCRIPTION OF EMBODIMENTS

A description will now be given of an embodiment of the present invention referring to drawings.

Figure 1:
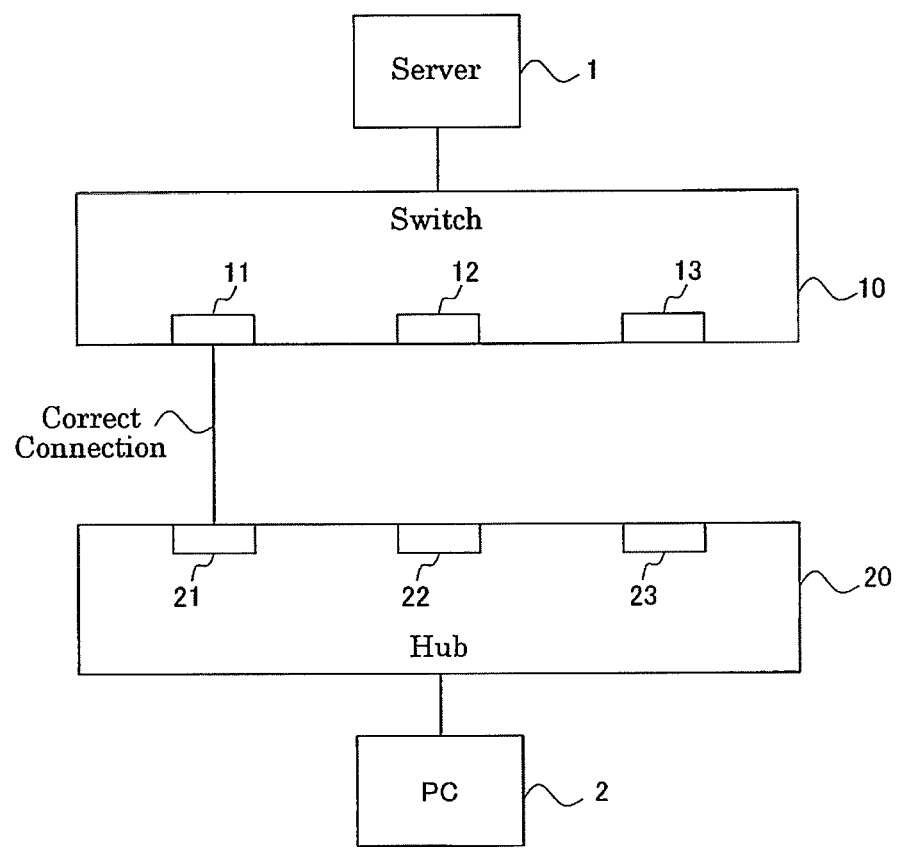
FIG. 1 is a diagram showing a network configuration if a switch 10 according to an embodiment of the present invention is correctly connected to a hub 20.

FIG. 1 is a diagram showing a network configuration if a switch 10 according to an embodiment of the present invention is correctly connected to a hub 20.

The switch (network device) 10 according to the embodiment of the present invention includes a plurality of ports 11, 12, and 13. The hub (another network device) 20 is connected to the switch 10. The hub 20 also includes a plurality of ports 21, 22, and 23. A server 1 is connected to the switch 10, and a PC (personal computer) 2 is connected to the hub 20.

The port 11 of the switch 10 and the port 21 of the hub 20 are connected with each other via a well-known communication cable (such as 1000BASE-T cable). This connection enables correct communication between the server 1 and the PC 2 via the switch 10 and the hub 20. On this occasion the connection between the port 11 and the port 21 is referred to as "correct connection".

It should be noted that a connection port of the switch 10 to the server 1 and a connection port of the hub 20 to the PC 2 are omitted in FIG. 1.

First Embodiment

Figure 2:
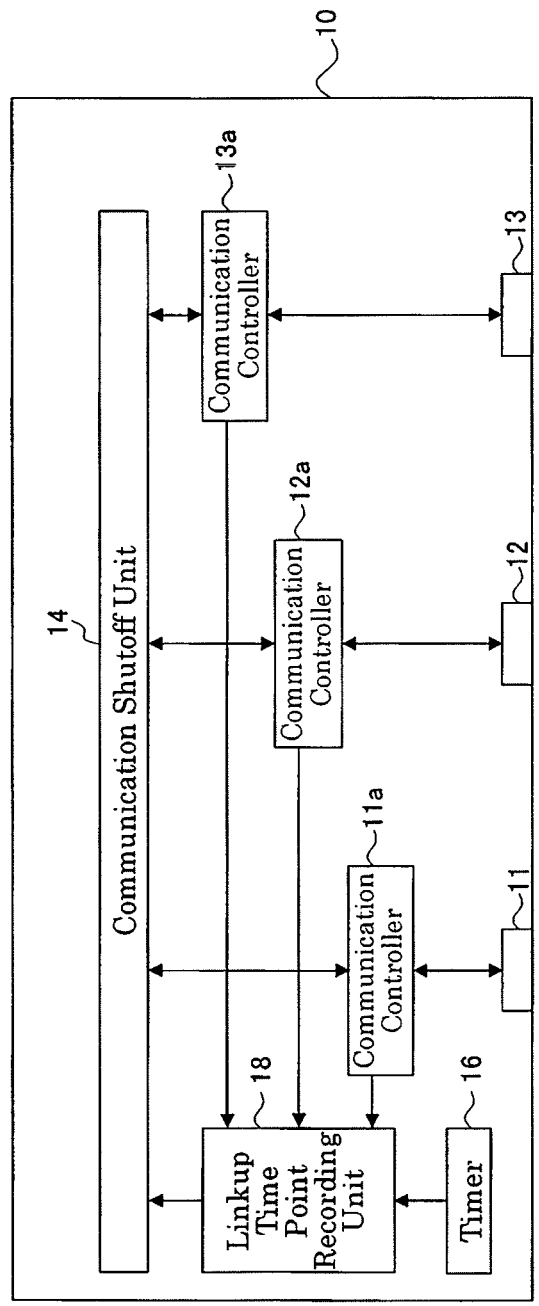
FIG. 2 is a functional block diagram showing a configuration of the switch 10 according to the first embodiment of the present invention.

FIG. 2 is a functional block diagram showing a configuration of the switch 10 according to the first embodiment of the present invention.

The switch 10 includes communication controllers 11a, 12a, and 13a, a communication shutoff unit 14, a timer 16 and a linkup time point recording unit 18.

The communication controllers 11a, 12a, and 13a control communication on the respective ports 11, 12, and 13. The communication controller 11a is connected to the port 11 to control the communication on the port 11. The communication controller 12a is connected to the port 12 to control the communication on the port 12. The communication controller 13a is connected to the port 13 to control the communication on the port 13.

The communication shutoff unit 14 shuts off the communication on any of the ports 11, 12, and 13.

It should be noted that the connection port of the switch 10 to the server 1 and mutual communication of data among communication controllers 11a, 12a, and 13a are omitted in FIG. 2.

The timer 16 measures a time point and a period, and serves as a clock.

The linkup time point recording unit 18 records a detection time point of the linkup on the port while the detection time point is associated with a linkup detected port, which is the port on which the linkup is detected. For example, referring to FIG. 7, if a linkup is detected at a time point t1 on the port 11 (refer to FIG. 7(1)), the detection time point t1 is recorded while the time point t1 is associated with the linkup detected port 11 (refer to FIG. 7(2)). If a linkup is detected on the port 13 at a time point t3 (refer to FIG. 7(3)), the detection time point t3 is recorded while the time point t3 is associated with the linkup detected port 13 (refer to FIG. 7(4)).

Figure 3:
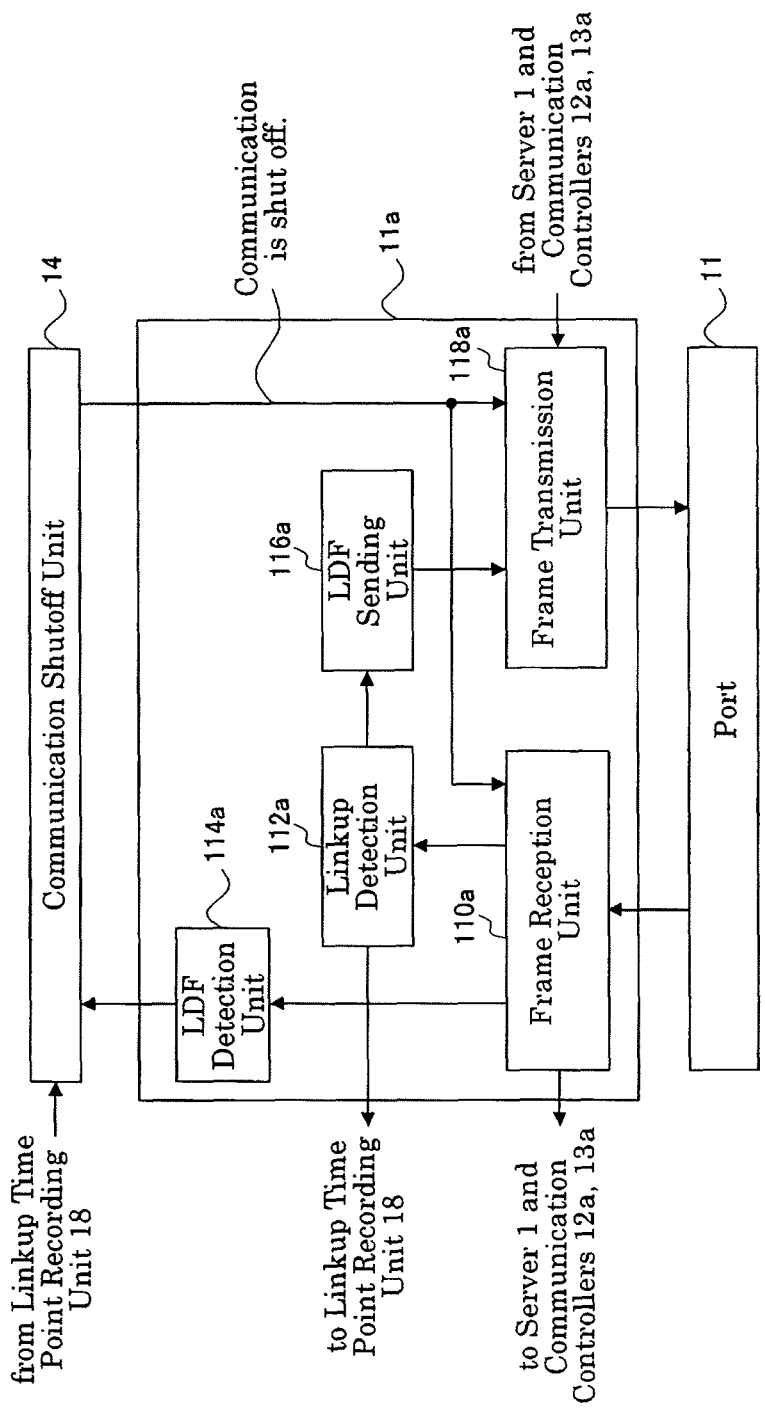
FIG. 3 is a functional block diagram showing a configuration of the communication controller 11a included by the switch 10 according to the first embodiment of the present invention.

FIG. 3 is a functional block diagram showing a configuration of the communication controller 11a included by the switch 10 according to the first embodiment of the present invention.

The communication controller 11a includes a frame reception unit 110a, a linkup detection unit 112a, a loop detection frame detection unit 114a (a loop detection unit), a loop detection frame sending unit 116a, and a frame transmission unit 118a.

The frame reception unit 110a receives a frame via the port 11. It should be noted that if a destination of the frame is the server 1, the frame reception unit 110a forwards the frame toward the server 1. Moreover, if the destination of the frame is the communication controller 12a, the frame reception unit 110a forwards the frame toward the communication controller 12a. Further, if the destination of the frame is the communication controller 13a, the frame reception unit 110a forwards the frame toward the communication controller 13a. For example, if the frame reception unit 110a receives a broadcasted frame via the port 11, the frame reception unit 110a forwards the frame toward the server 1, the communication controller 12a, and the communication controller 13a.

The linkup detection unit 112a detects a linkup of the port 11. The linkup of the port 11 refers to a state where the port 11 is connected to another network device (such as the hub 20) (via a cable of 1000BASE-T for example), and is brought into a state where the communication is available.

The linkup detection unit 112a reads a frame received by the frame reception unit 110a from the frame reception unit 110a, and, if the frame read from the frame reception unit 110a is a normal link pulse (NLP), detects the linkup of the port 11.

When the linkup detection unit 112a detects the linkup of the port 11, the linkup detection unit 112a immediately transmits a notification of the linkup to the linkup time point recording unit 18 and the loop detection frame sending out unit 116a. When the linkup time point recording unit 18 receives the notification of the linkup detection from the linkup detection unit 112a, the linkup time point recording unit 18 acquires a time point t1 of the notification from the timer 16. The linkup time point recording unit 18 records the time point t1 as a detection time point while the time point t1 is associated with the linkup detected port 11.

It should be noted that the linkup detected port is the port on which the linkup is detected. If the linkup is detected by the linkup detection unit 112a, the port 11 is the linkup detected port.

After a predetermined period (refer to Δt in FIG. 10, for example) has elapsed since a time point when the linkup is detected by the linkup detection unit 112a, or periodically, the loop detection frame sending unit 116a sends a loop detection frame (LDF) from the port 11, which is a linkup detected port, via the frame transmission unit 118a. The loop detection frame may be broadcasted. It should be noted that, though the LDF is mentioned as an example of the loop detection frame, it is only necessary for the loop detection frame to be distinguished from a frame used for ordinary communication.

If the loop detection frame detection unit (loop detection unit) 114a receives the loop detection frame on the port 11, the loop detection frame detection unit 114a detects the loop detection frame. The loop detection frame detection unit 114a detects the loop detection frame thereby detecting a loop (refer to FIG. 9) formed by the switch 10. Such a notification that the loop formed by the switch 10 is detected is transmitted from the loop detection frame detection unit 114a to the communication shutoff unit 14.

The loop detection frame detection unit 114a reads the frame received by the frame reception unit 110a from the frame reception unit 110a. If the read frame is the loop detection frame, the loop detection frame detection unit 114a detects the loop detection frame.

The frame transmission unit 118a transmits a frame (such as a loop detection frame) via the port 11. It should be noted that if the frame transmission unit 118a receives a frame from the server 1, the communication controller 12a, and the communication controller 13a, the frame transmission unit 118a transmits the frame via the port 11.

When the loop is detected by the loop detection frame detection unit 114a, the communication shutoff unit 14 shuts off communication on a port on which the linkup was detected at a later time point. It should be noted that the communication shutoff unit 14 acquires the port on which the linkup was detected at a later time point based on the recorded content in the linkup time point recording unit 18, and shuts off the communication.

For example, if the detection time point t1 associated with the linkup detected port 11 is recorded, and the detection time point t3 associated with the linkup detected port 13 is recorded in the linkup time point recording unit 18 (it should be noted that the detection time point t3 is later than the detection time point t1, refer to FIG. 7), the communication shutoff unit 14 shuts off the communication on the port 13, which is the port on which the linkup was detected at a later time point.

It should be noted that when the communication shutoff unit 14 shuts off the communication on the port 11, the reception by the frame reception unit 110*a* is stopped, and the transmission by the frame transmission unit 118*a* is also stopped. It should be noted that the stop of the reception by the frame reception unit 110*a* includes a case in which a frame is received by the frame reception unit 110*a*, but the frame is discarded.

Figure 4:
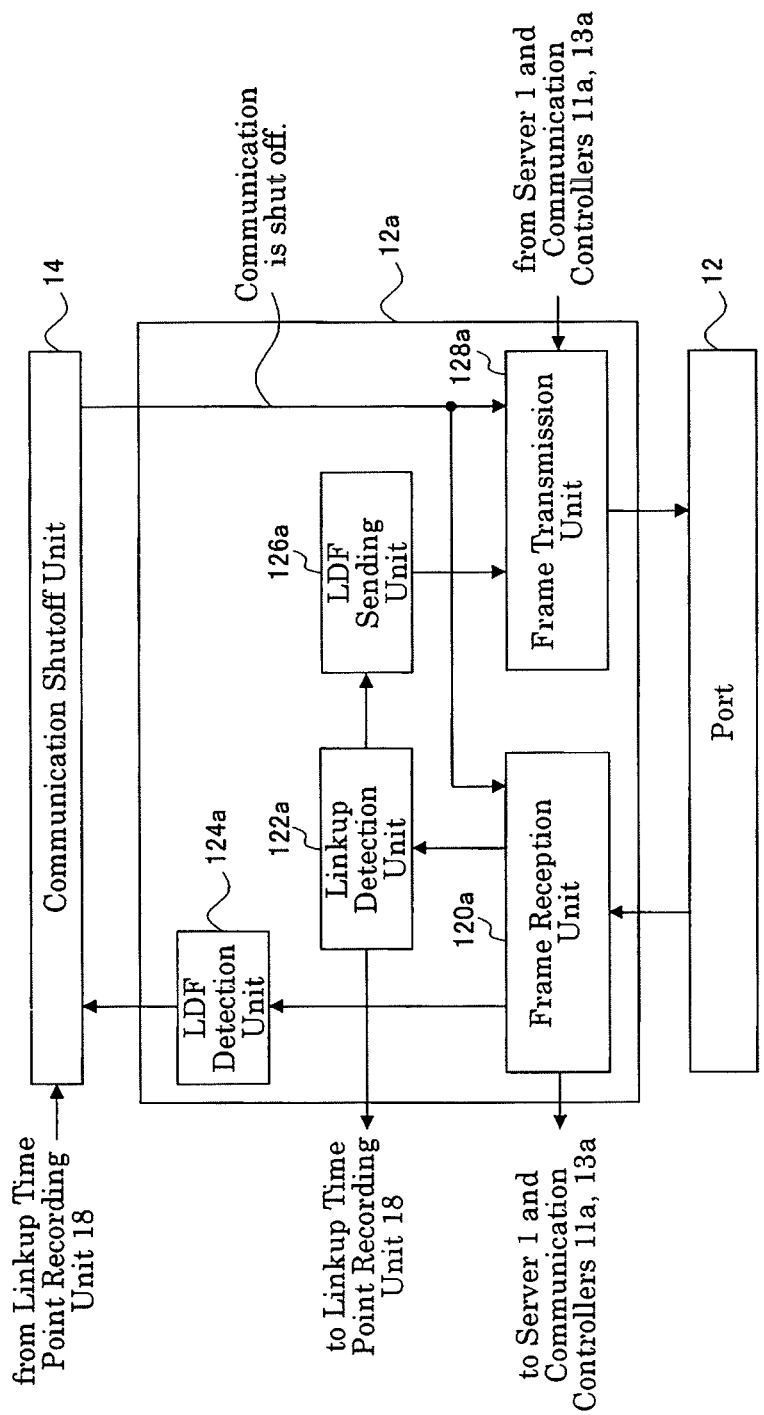
FIG. 4 is a functional block diagram showing a configuration of the communication controller 12a included by the switch 10 according to the first embodiment of the present invention.

FIG. 4 is a functional block diagram showing a configuration of the communication controller 12*a* included by the switch 10 according to the first embodiment of the present invention.

The communication controller 12*a* includes a frame reception unit 120*a*, a linkup detection unit 122*a*, a loop detection frame detection unit 124*a* (a loop detection unit), a loop detection frame sending unit 126*a*, and a frame transmission unit 128*a*.

The frame reception unit 120*a*, the linkup detection unit 122*a*, the loop detection frame detection unit 124*a*, the loop detection frame sending unit 126*a*, and the frame transmission unit 128*a* are respectively the same as the frame reception unit 110*a*, the linkup detection unit 112*a*, the loop detection frame detection unit 114*a*, the loop detection frame sending unit 116*a*, and the frame transmission unit 118*a*.

It should be noted that the frame reception unit 120*a*, the linkup detection unit 122*a*, the loop detection frame detection unit 124*a*, the loop detection frame sending unit 126*a*, and the frame transmission unit 128*a* carry out processing relating to the port 12, which is a point different from the frame reception unit 110*a*, the linkup detection unit 112*a*, the loop detection frame detection unit 114*a*, the loop detection frame sending unit 116*a*, and the frame transmission unit 118*a* which carry out processing relating to the port 11.

Moreover, if a destination of the frame is the communication controller 11*a*, the frame reception unit 120*a* forwards the frame toward the communication controller 11*a*. For example, if the frame reception unit 120*a* receives a broadcasted frame via the port 12, the frame reception unit 120*a* forwards the frame toward the server 1, the communication controller 11*a*, and the communication controller 13*a*.

Further, the frame transmission unit 128*a* transmits a frame (such as a loop detection frame) via the port 12. It should be noted that if the frame transmission unit 128*a* receives a frame from the server 1, the communication controller 11*a*, and the communication controller 13*a*, the frame transmission unit 128*a* transmits the frame via the port 12.

When the communication shutoff unit 14 shuts off the communication on the port 12, the reception by the frame reception unit 120*a* is stopped, and, simultaneously, the transmission by the frame transmission unit 128*a* is also stopped. It should be noted that the stop of the reception by the frame reception unit 120*a* includes a case in which a frame is received by the frame reception unit 120*a*, but the frame is discarded.

Figure 5:
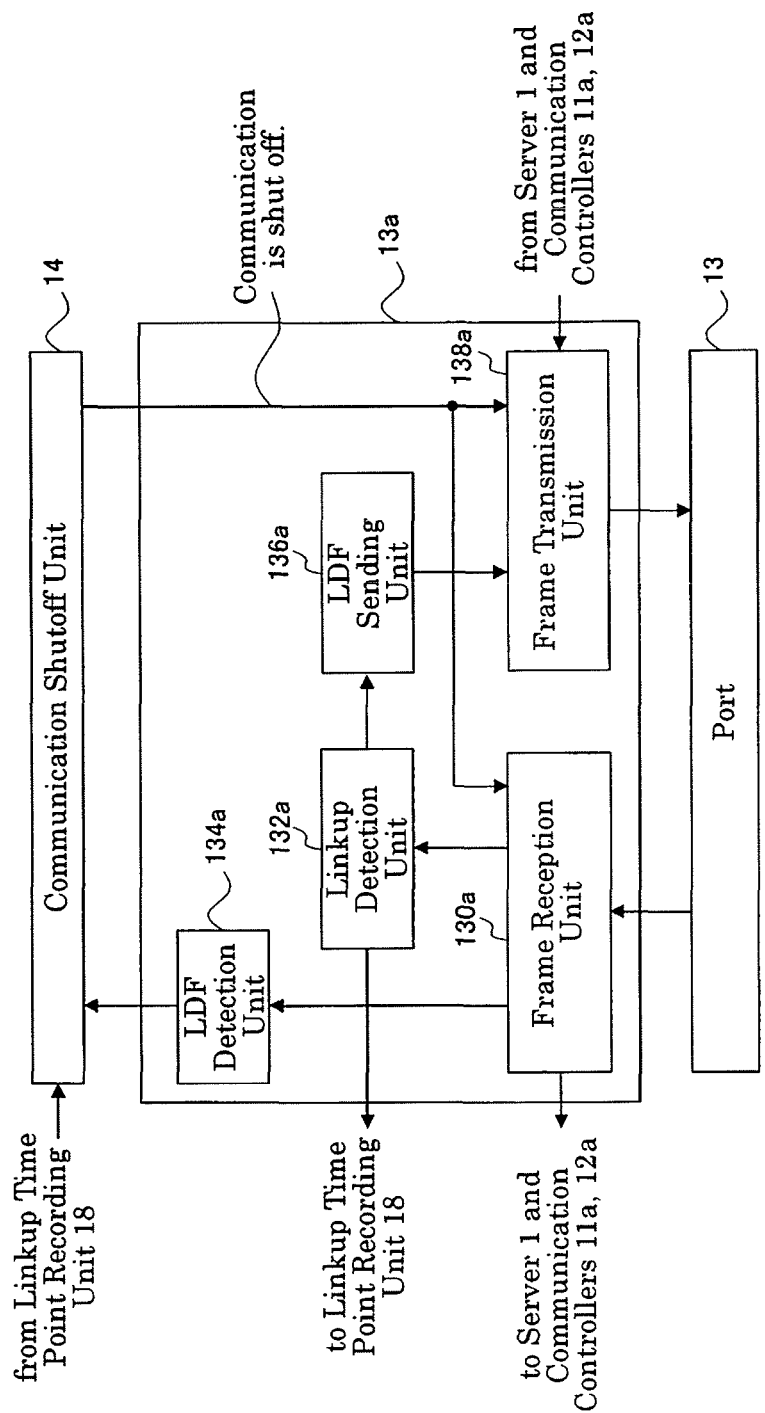
FIG. 5 is a functional block diagram showing a configuration of the communication controller 13a included by the switch 10 according to the first embodiment of the present invention.

FIG. 5 is a functional block diagram showing a configuration of the communication controller 13*a* included by the switch 10 according to the first embodiment of the present invention.

The communication controller 13*a* includes a frame reception unit 130*a*, a linkup detection unit 132*a*, a loop detection frame detection unit 134*a* (a loop detection unit), a loop detection frame sending unit 136*a*, and a frame transmission unit 138*a*.

The frame reception unit 130*a*, the linkup detection unit 132*a*, the loop detection frame detection unit 134*a*, the loop detection frame sending unit 136*a*, and the frame transmission unit 138*a* are respectively the same as the frame reception unit 110*a*, the linkup detection unit 112*a*, the loop detection frame detection unit 114*a*, the loop detection frame sending unit 116*a*, and the frame transmission unit 118*a*.

It should be noted that the frame reception unit 130*a*, the linkup detection unit 132*a*, the loop detection frame detection unit 134*a*, the loop detection frame sending unit 136*a*, and the frame transmission unit 138*a* carry out processing relating to the port 13, which is a point different from the frame reception unit 110*a*, the linkup detection unit 112*a*, the loop detection frame detection unit 114*a*, the loop detection frame sending unit 116*a*, and the frame transmission unit 118*a* which carry out processing relating to the port 11.

Moreover, if a destination of the frame is the communication controller 11*a*, the frame reception unit 130*a* forwards the frame toward the communication controller 11*a*. For example, if the frame reception unit 130*a* receives a broadcasted frame via the port 13, the frame reception unit 130*a* forwards the frame toward the server 1, the communication controller 11*a*, and the communication controller 12*a*.

Further, the frame transmission unit 138*a* transmits a frame (such as a loop detection frame) via the port 13. It should be noted that if the frame transmission unit 138*a* receives a frame from the server 1, the communication controller 11*a*, and the communication controller 12*a*, the frame transmission unit 138*a* transmits the frame via the port 13.

When the communication shutoff unit 14 shuts off the communication on the port 13, the reception by the frame reception unit 130*a* is stopped, and, simultaneously, the transmission by the frame transmission unit 138*a* is also stopped. It should be noted that the stop of the reception by the frame reception unit 130*a* includes a case in which a frame is received by the frame reception unit 130*a*, but the frame is discarded.

A description will now be given of an operation of the embodiment of the present invention.

Figure 6:
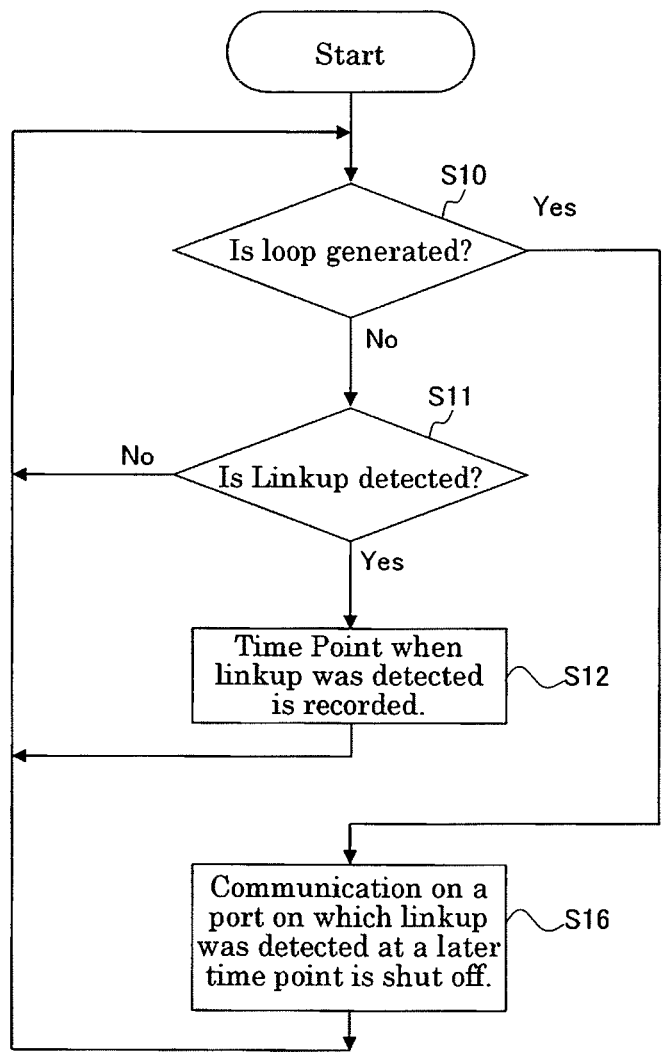
FIG. 6 is a flowchart showing an operation of the switch 10 according to the first embodiment of the present invention.

FIG. 6 is a flowchart showing an operation of the switch 10 according to the first embodiment of the present invention. FIG. 7 is a diagram showing timings of the operation of the switch 10 according to the first embodiment of the present invention. FIG. 8 is a diagram showing an operation of the switch 10 if the switch 10 according to the first embodiment of the present invention is correctly connected to the hub 20. FIG. 9 is a diagram showing an operation of the switch 10 if the switch 10 according to the first embodiment of the present invention is incorrectly connected to the hub 20.

Figure 7:
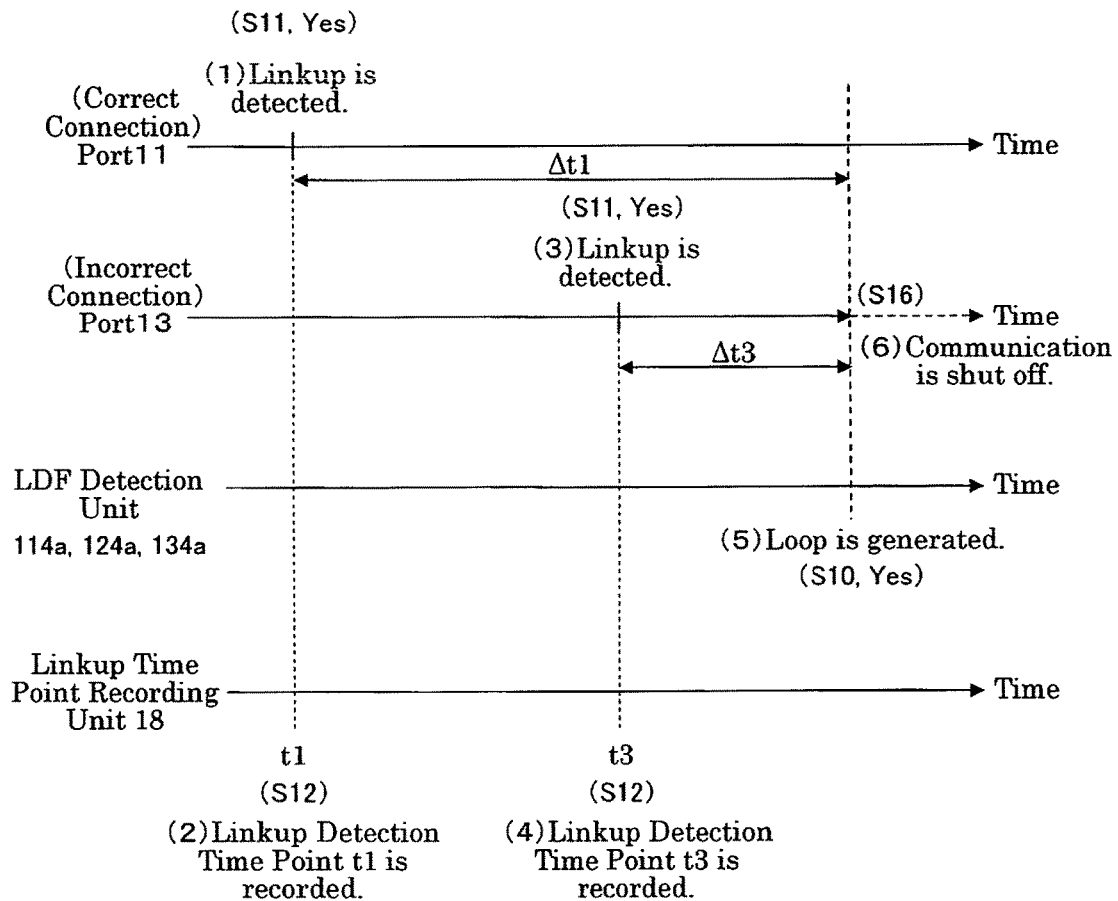
FIG. 7 is a diagram showing timings of the operation of the switch 10 according to the first embodiment of the present invention.
Figure 8:
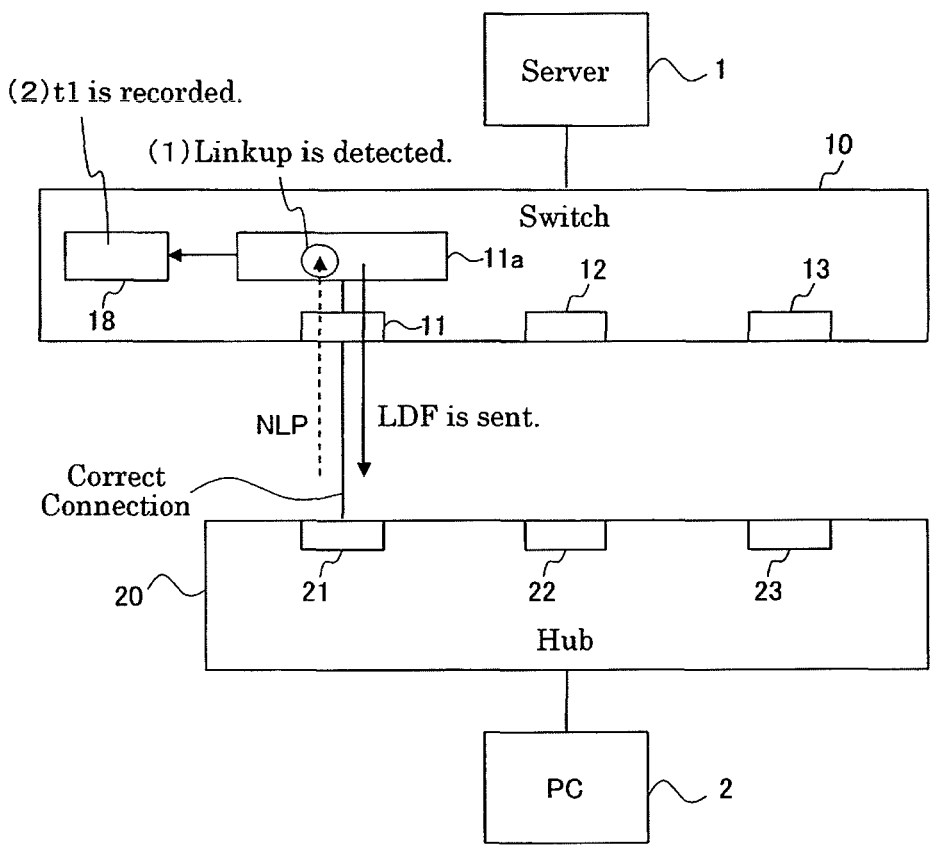
FIG. 8 is a diagram showing an operation of the switch 10 if the switch 10 according to the first embodiment of the present invention is correctly connected to the hub 20.
Figure 9:
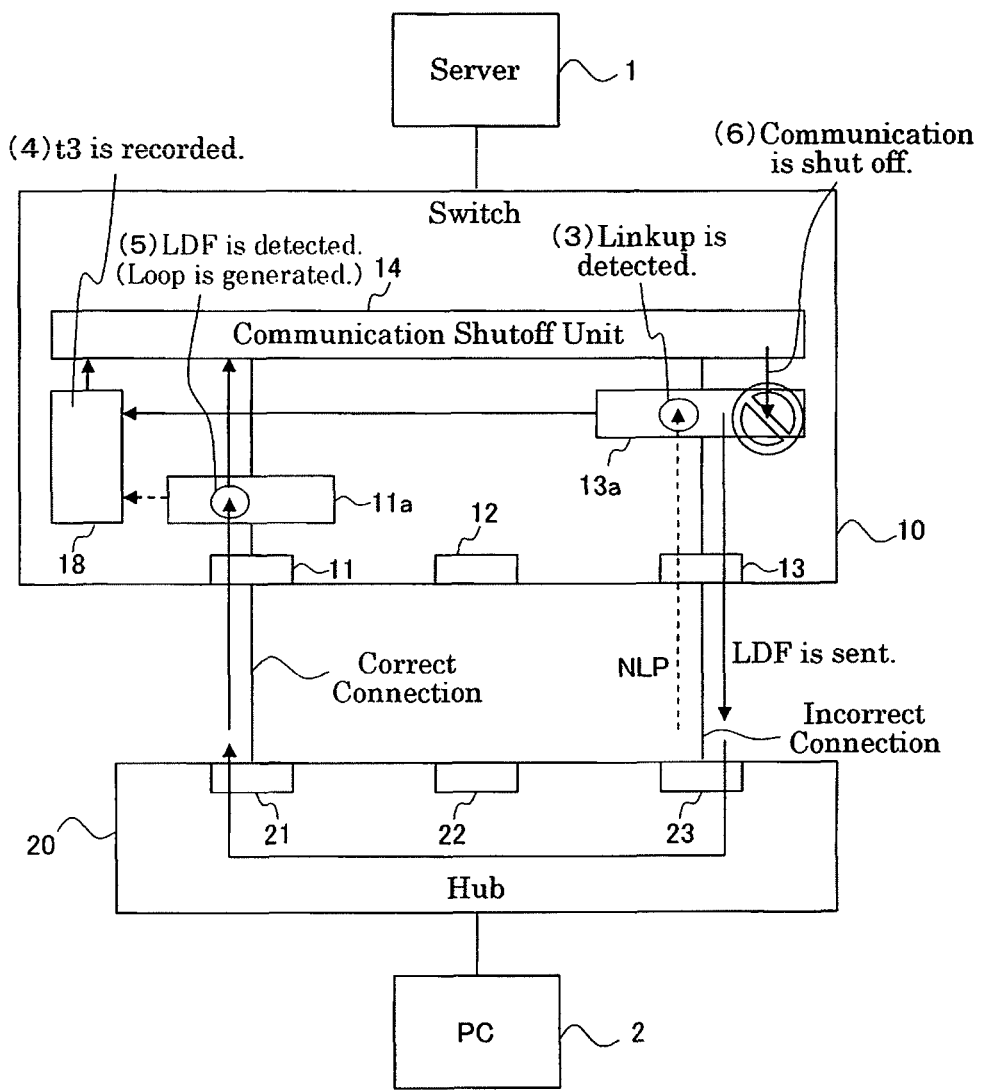
FIG. 9 is a diagram showing an operation of the switch 10 if the switch 10 according to the first embodiment of the present invention is incorrectly connected to the hub 20.

A description is given of the operation of the embodiment of the present invention after the correct connection is made as shown in FIG. 8 until the incorrect connection is made as shown in FIG. 9 with reference to FIGS. 6 and 7.

Referring to FIG. 6, the communication shutoff unit 14 determines whether or not such a notification that the loop formed by the switch 10 has been detected has been transmitted from the loop detection frame detection unit (loop detection unit) 114a, 124a, or 134a (S10). If the notification that the loop has been detected has not been transmitted (No in S10), the linkup detection units 112a, 122a, and 132a wait until the ports 11, 12, and 13 link up (No in S11). When the port 11, 12, or 13 links up, the linkup detection unit 112a, 122a, or 132a detects the linkup (Yes in S11).

When the linkup is detected, the detection is immediately transmitted to the linkup time point recording unit 18, and a detection time point when the linkup is detected is associated with the linkup detected port, and is recorded in the linkup time point recording unit 18 (S12).

It should be noted that after a predetermined period Δt from the detection of the linkup, or periodically, the loop detection frame sending out unit 116a, 126a, or 136a to which the linkup detection unit 112a, 122a, or 132a, which has detected the linkup, is connected sends out a loop detection frame LDF via the frame transmission unit 118a, 128a, or 138a from the port 11, 12, or 13, which is the linkup detected port.

Then, the process of the switch 10 returns to the determination whether the notification of the detection of the loop has been transmitted or not (S10).

For example, as shown in FIG. 8, it is assumed that the port 11 of the switch 10 and the port 21 of the hub 20 are correctly connected with each other. Then, the loop detection frame LDF has not been transmitted to the switch 10, and it is determined that a loop is not generated (No in S10). Moreover, a normal link pulse NLP is transmitted from the port 21 of the hub 20 to the port 11 of the switch 10. The normal link pulse NLP is detected by the linkup detection unit 112a of the communication controller 11a (refer to "Yes in S11" in FIG. 6). Refer to "(1) Linkup is detected" in FIGS. 7 and 8. In this case, the port 11 is a linkup detected port.

Then, the detection of the linkup is immediately transmitted to the linkup time point recording unit 18, and the detection time point t1 when the linkup was detected is associated with the linkup detected port 11, and is recorded in the linkup time point recording unit 18 (refer to "S12" in FIG. 6). Refer to "(2) t1 is recorded" in FIGS. 7 and 8.

It should be noted that after the predetermined period Δt has elapsed from the linkup detection, or periodically, the loop detection frame sending out unit 116a to which the linkup detection unit 112a, which has detected the linkup in the communication controller 11a, is connected sends the loop detection frame LDF via the frame transmission unit 118a from the port 11.

It should be noted that the predetermined period Δt may be set by a user of the switch 10. It should be noted that the predetermined period Δt may be fixed when the switch 10 is delivered.

Referring to FIG. 8, even if the loop detection frame LDF is sent out, the loop detection frame LDF will not return from the hub 20 to the switch 10, and the loop detection frame sending out units 116a, 126a, and 136a will not detect the loop detection frame LDF, and a loop is thus not detected (refer to "No in S10" in FIG. 6).

Returning to FIG. 6, if the loop detection frame sending out unit 116a, 126a, or 136a detects the loop detection frame LDF, a loop formed by the switch 10 is detected (Yes in S10), and the communication shutoff unit 14 shuts off the communication on a port on which the linkup was detected at a later time point (S16). As a result, the loop is dissolved.

For example, it is assumed that the port 13 of the switch 10 and the port 23 of the hub 20 are connected by mistake (referred to as "incorrect connection") in the correctly connected state as shown in FIG. 8. An operation of the switch 10 for this incorrect connection is shown in FIG. 9. In this case, a loop is formed by the switch 10, the hub 20, the connection between the ports 11 and 21, and the connection between the ports 13 and 23.

Then, referring to FIG. 9, a normal link pulse NLP is transmitted from the port 23 of the hub 20 to the port 13 of the switch 10. The normal link pulse NLP is detected by the linkup detection unit 132a of the communication controller 13a (refer to "Yes in S11" in FIG. 6). Refer to "(3) Linkup is detected" in FIGS. 7 and 9. In this case, the port 13 is a linkup detected port.

Then, the detection of the linkup is immediately transmitted to the linkup time point recording unit 18, and the detection time point t3 when the linkup was detected is associated with the linkup detected port 13, and is recorded in the linkup time point recording unit 18 (refer to "S12" in FIG. 6). Refer to "(4) t3 is recorded" in FIGS. 7 and 9.

At this time point, the detection time point t1 associated with the linkup detected port 11 is recorded, and the detection time point t3 associated with the linkup detected port 13 are recorded in the linkup time point recording unit 18. It should be noted that the detection time point t3 is later than the detection time point t1. Thus, the port on which the linkup was detected at a later time point is the port 13.

It should be noted that after a predetermined period Δt from the detection of the linkup, or periodically, the loop detection frame sending unit 136a to which the linkup detection unit 132a, which has detected the linkup in the communication controller 13a, is connected sends the loop detection frame LDF via the frame transmission unit 138a from the port 13.

It should be noted that the predetermined period Δt may be set by the user of the switch 10 as described before. It should be noted that the predetermined period Δt may be fixed when the switch 10 is delivered.

Referring to FIG. 9, when the loop detection frame LDF is sent out from the port 13, the loop detection frame LDF is output via the port 23 and the hub 20 from the port 21. Further, the loop detection frame LDF output from the port 21 of the hub 20 is received on the port 11 of the switch 10. Then, the loop detection frame LDF is detected by the loop detection frame detection unit 114a of the communication controller 11a. As a result, the loop formed by the switch 10 is detected (refer to "Yes in S10" in FIG. 6). Refer to "(5) Loop is generated." in FIGS. 7 and 9.

It should be noted that if the loop detection frame LDF is sent out from the port 11, and is received on the port 13, the loop detection frame LDF is detected by the loop detection frame detection unit 134a of the communication controller 13a. Also in this case, the loop formed by the switch 10 is still detected (refer to "Yes in S10" in FIG. 6).

The communication shutoff unit 14 receives the notification of the detection of the loop from the loop detection frame detection unit 114a (or 134a), refers to the recorded contents of the linkup time point recording unit 18, and shuts off the communication on the port 13 on which the linkup was detected at a later time point (refer to "S16" of FIG. 6). In other words, the communication shutoff unit 14 stops the reception by the frame reception unit 130a of the communication controller 13a, and simultaneously stops the transmission by the frame transmission unit 138a of the communication controller 13a. Refer to "(6) Communication is shut off" in FIGS. 7 and 9.

If the connection between the ports 11 and 21, and the connection between the ports 13 and 23 are left, the loop is generated, which interferes the communication. However, the loop is dissolved by shutting off the communication on the port 13.

According to the first embodiment of the present invention, the communication shutoff unit 14 shuts off the communication on the port 13, and the loop is thus dissolved. Moreover, the port the communication by which is shut off upon the loop dissolution is not the port 11 relating to the correct connection, but the port 13 relating to the incorrect connection. Therefore, upon the loop dissolution, the server 1 and the PC 2 can communicate with each other via the port 11 of the switch 10 and the port 21 of the hub 20 which are correctly connected with each other.

In other words, as shown in FIG. 8, for the case of the correct connection (connection between ports 11 and 21), the switch 10 will not detect the loop detection frame LDF. On the other hand, as shown in FIG. 9, if an incorrect connection (connection between ports 13 and 23) is further carried out, the loop detection frame LDF sent out from the port 13 (or the port 11) is detected by the loop detection frame detection unit 114a of the communication controller 11a (or the loop detection frame detection unit 134a of the communication controller 13a) of the switch 10 (refer to "(5) LDF is detected" in FIG. 9). As a result, the loop formed by the switch 10 is detected. In this case, the communication by the incorrect connection can be shut off by shutting off the communication on the port 13 on which the linkup was detected at a later time point (refer to "(6) Communication is shut off" in FIG. 9). On this occasion, it should be noted that the communication on the port 11 relating to the correct connection is not shut off. This is because the port on which the linkup was detected at a later time point is the port 13 relating to the incorrect connection.

If the communication on the port 11 relating to the correct connection is shut off, the communication between the switch 10 and the hub 20 is carried out via the port 13 relating to the incorrect connection. However, setting for the communication on the port 13 connected incorrectly may be different from setting for the communication on the port 11 connected correctly. Therefore, the communication via the port 13 is not guaranteed.

However, according to the first embodiment of the present invention, the communication on the port 11 relating to the correct connection is not shut off, the communication on the port 13 relating to the incorrect connection is shut off, and the communication between the server 1 and the PC 2 via the correct connection (ports 11 and 21) can be continued.

It should be noted that such a case of setting the predetermined period Δt to 0 is conceivable.

It should be noted that after the linkup is detected, until the loop detection frame LDF is detected, the communication on the linkup detected port is not shut off.

It should be noted that the following modified examples of the first embodiment of the present invention are conceivable.

First Variation

Figure 10:
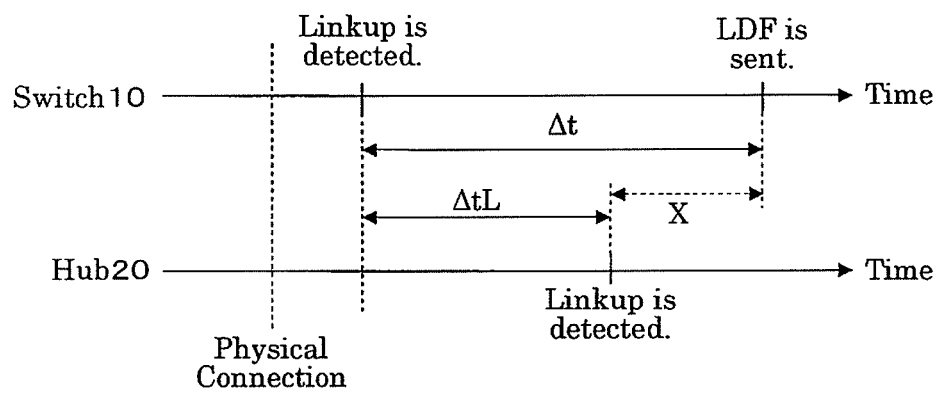
FIG. 10 is a diagram showing a preferred example of the predetermined period Δt.

FIG. 10 is a diagram showing a preferred example of the predetermined period Δt.

The predetermined period Δt is preferably longer than a difference ΔtL between the period required for detecting the linkup by the switch 10 and the period required for detecting the linkup by the hub 20. For example, it is conceivable to set Δt to 0.5 second. It should be noted that the period required for detecting the linkup is a period from a physical connection via a communication cable until the detection of the linkup.

In general, the switch 10 can carry out data processing at a higher speed than the hub 20, and the detection of the linkup by the switch 10 is finished earlier than the detection of the linkup by the hub 20. Moreover, communication on a certain port (such as the port 23) may be configured to be shut off until the linkup is detected for this port in the hub 20.

If the loop detection frame LDF is sent immediately after the linkup on the port 13 is detected by the switch 10, there may be generated such a state that the hub 20 may have not detected the linkup on the port 23. Then, the hub 20 shuts off the loop detection frame LDF transmitted toward the port 23, and the switch 10 cannot detect the loop detection frame LDF. In this state, although the connection is incorrect, the communication is not shut off, and the loop cannot be dissolved.

Thus, the loop detection frame LDF is preferably sent after the detection of the linkup by the hub 20. The predetermined period Δt is preferably longer than the difference ΔtL between the period required for detecting the linkup by the switch 10 and the period required for detecting the linkup by the hub 20.

It should be noted that the communication is available after the detection of the linkup in the switch 10 and the hub 20. In this case, a loop may be formed in a period X (refer to FIG. 10) after the linkup is detected in the hub 20 until the loop detection frame LDF is sent from the switch 10. If the loop is formed, broadcast frames are transmitted and received between the switch 10 and the hub 20, and the period X is long enough, a broadcast storm may be generated. If a broadcast storm is generated, the switch 10 may not detect the loop detection frame LDF. In this case, the communication on the port 13 relating to the incorrect connection cannot be shut off, and the loop cannot be dissolved.

Thus, if the communication on the linkup detected port is shut off in the period X, the broadcast storm as described above can be prevented from being generated. For example, if, in the hub 20, the communication on the linkup detected port is shut off before the detection of the linkup until the sending of the loop detection frame LDF from the switch 10, the broadcast storm as described above can be prevented from being generated.

For example, if the communication on the linkup detected port is shut off after the linkup is detected in the switch 10 until the loop detection frame LDF is sent from the switch 10, the broadcast storm as described above can be prevented from being generated.

It should be noted that the period "before the linkup is detected in the hub 20" includes a time point when the linkup is detected in the hub 20.

As described above, it should be noted that even if the communication on the linkup detected port is shut off in a period including the period X, the communication on the linkup detected port is not shut off after the loop detection frame LDF is sent until the loop detection frame LDF is detected.

Second Variation

Though the switch 10 according to the first embodiment includes the linkup time point recording unit 18, the switch 10 may include a detection period recording unit 180 in place of the linkup time point recording unit 18.

Figure 18:
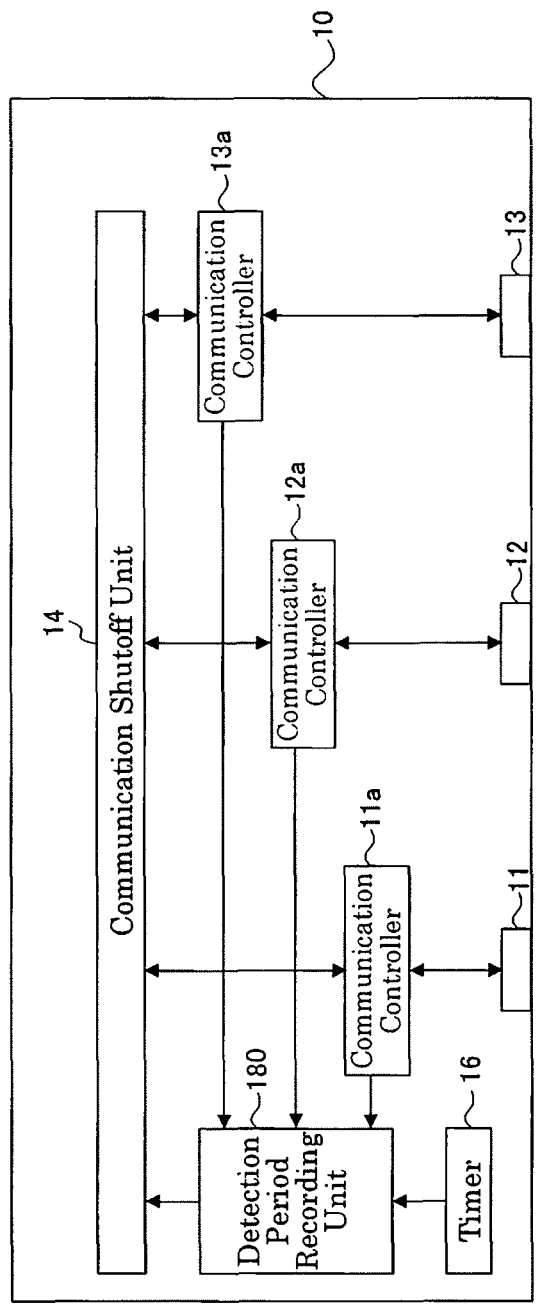
FIG. 18 is a functional block diagram showing the configuration of the switch 10 according to a second variation of the first embodiment of the present invention.

FIG. 18 is a functional block diagram showing the configuration of the switch 10 according to a second variation of the first embodiment of the present invention.

The switch 10 according to the second variation includes the communication controllers 11a, 12a, and 13a, the communication shutoff unit 14, the timer 16, and the detection period recording unit 180. The communication controllers 11a, 12a, and 13a, and the timer 16 are the same as those of the first embodiment.

The detection period recording unit 180 records a detection period from detection of a linkup on a port until a loop is detected while the detection period is associated with a linkup detected port, which is the port on which the linkup was detected. For example, referring to FIG. 7, a detection period $\Delta t1$ from the detection of the linkup on the port 11 until the detection of the loop is associated with the linkup detected port 11, and is recorded. Further, a detection period $\Delta t3$ from the detection of the linkup on the port 13 until the detection of the loop is associated with the linkup detected port 13, and is recorded. Measurement of the detection period is carried out by using the timer 16.

The communication shutoff unit 14 shuts off the communication on the linkup detected port 13 corresponding to the shorter period $\Delta t3$ out of the detection periods $\Delta t1$ and $\Delta t3$ recorded in the detection period recording unit 180. The communication on the port on which the linkup was detected at a later time point can be shut off also in this way.

Second Embodiment

The switch 10 according to a second embodiment is different from that of the first embodiment in such a point that a reception rate is used to detect the loop.

The configuration of the switch 10 according to the second embodiment of the present invention is the same as that of the first embodiment (refer to FIG. 2), and a description thereof is therefore omitted.

Figure 11:
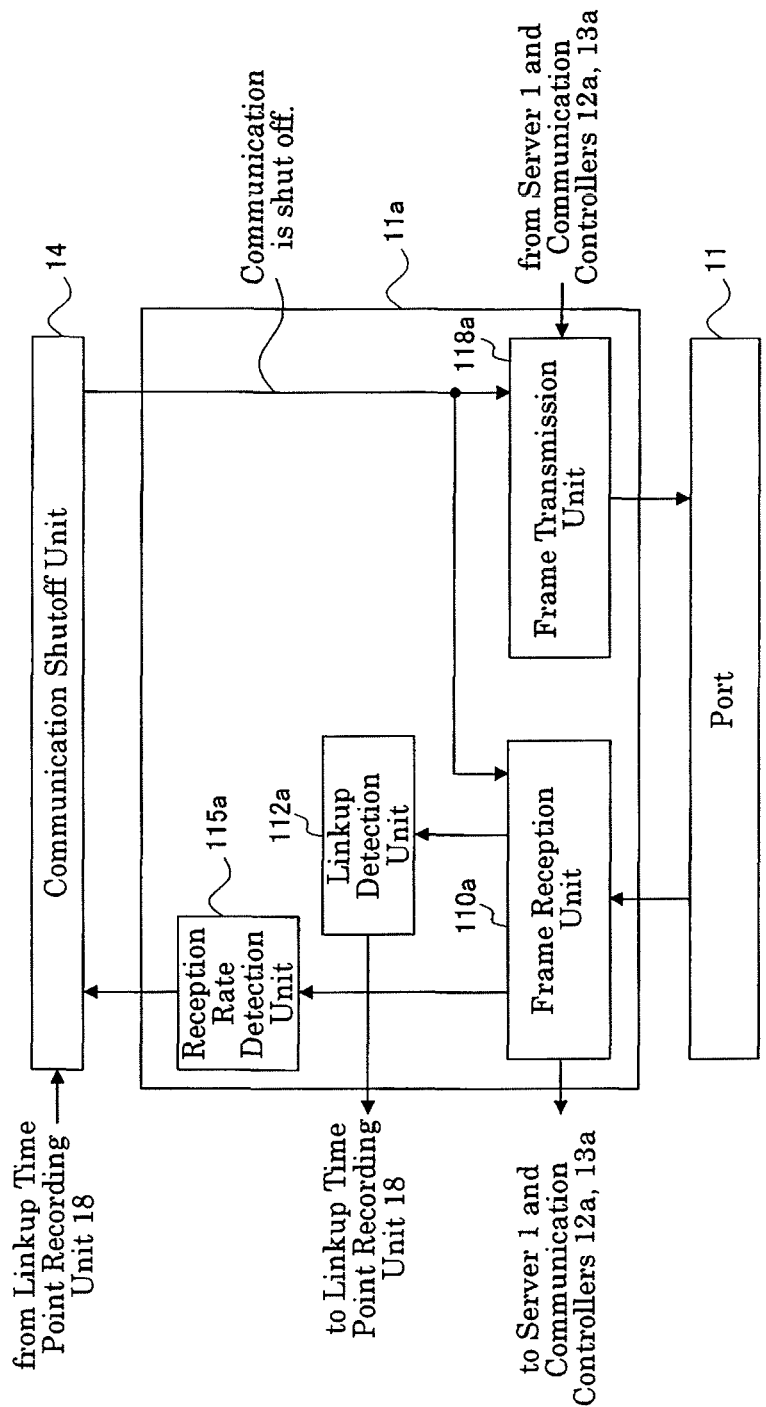
FIG. 11 is a functional block diagram showing the configuration of the communication controller 11a included by the switch 10 according to the second embodiment of the present invention.

FIG. 11 is a functional block diagram showing the configuration of the communication controller 11a included by the switch 10 according to the second embodiment of the present invention.

The communication controller 11a according to the second embodiment includes the frame reception unit 110a, the linkup detection unit 112a, a reception rate detection unit (loop detection unit) 115a, and the frame transmission unit 118a.

The frame reception unit 110a, the linkup detection unit 112a, and the frame transmission unit 118a are the same as those of the first embodiment, and a description thereof is therefore omitted.

The reception rate detection unit (loop detection unit) 115a detects a loop formed by the switch 10 based on the reception rate on the port 11. When a loop is formed by the switch 10, a broadcast storm and the like are generated, resulting in a possible increase in a communication rate. Thus the reception rate detection unit 115a acquires a size of a frame received by the frame reception unit 110a from the frame reception unit 110a, and detects a sum of the received sizes per unit period (such as one second) as the reception rate (Mbps). Further, when the reception rate becomes a reception rate equal to or more than a predetermined threshold (such as 80 Mbps), the reception rate detection unit 115a considers that a loop is generated, and detects the loop.

Figure 12:
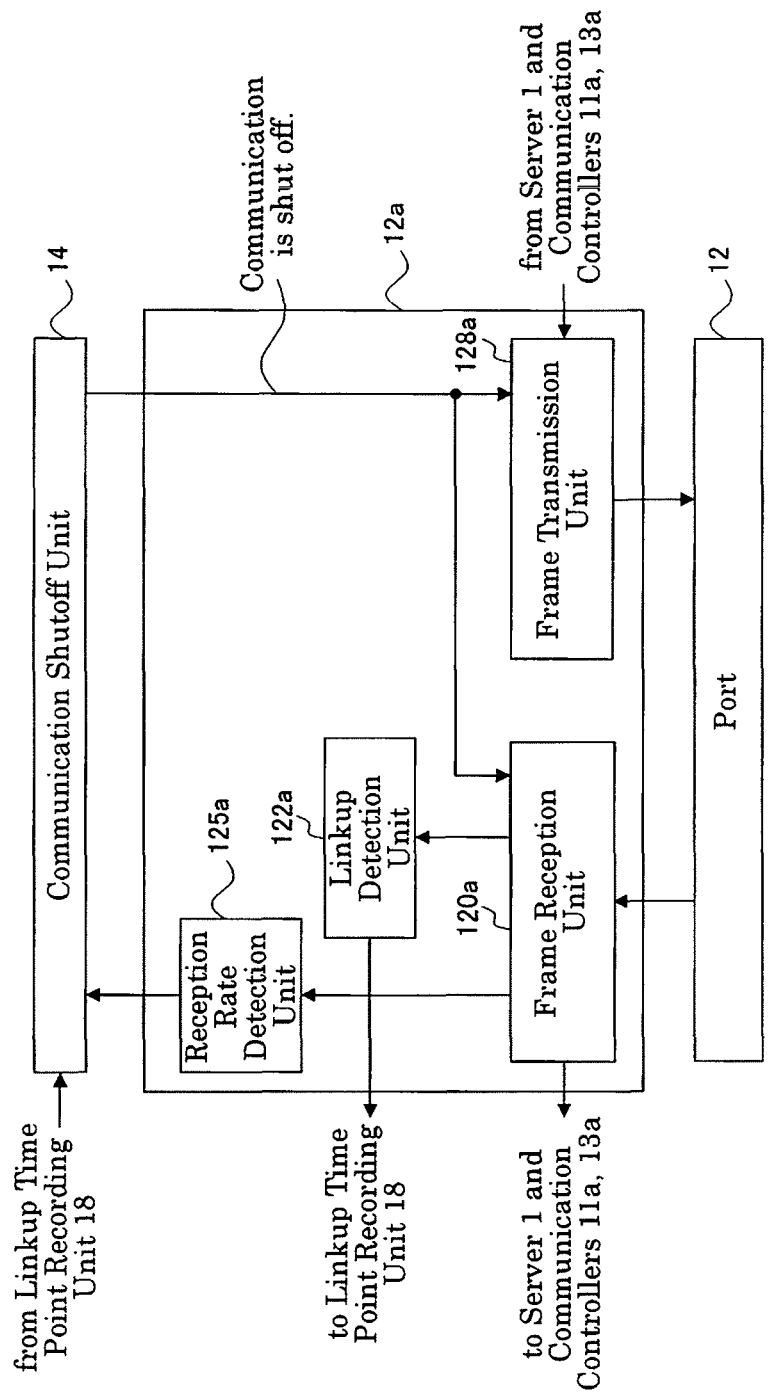
FIG. 12 is a functional block diagram showing the configuration of the communication controller 12a included by the switch 10 according to the second embodiment of the present invention.

FIG. 12 is a functional block diagram showing the configuration of the communication controller 12a included by the switch 10 according to the second embodiment of the present invention.

The communication controller 12a according to the second embodiment includes the frame reception unit 120a, the linkup detection unit 122a, a reception rate detection unit (loop detection unit) 125a, and the frame transmission unit 128a.

The frame reception unit 120a, the linkup detection unit 122a, and the frame transmission unit 128a are the same as those of the first embodiment, and a description thereof is therefore omitted.

The reception rate detection unit (loop detection unit) 125a is the same as the reception rate detection unit 115a, and detects a loop formed by the switch 10 based on the reception rate on the port 12.

Figure 13:
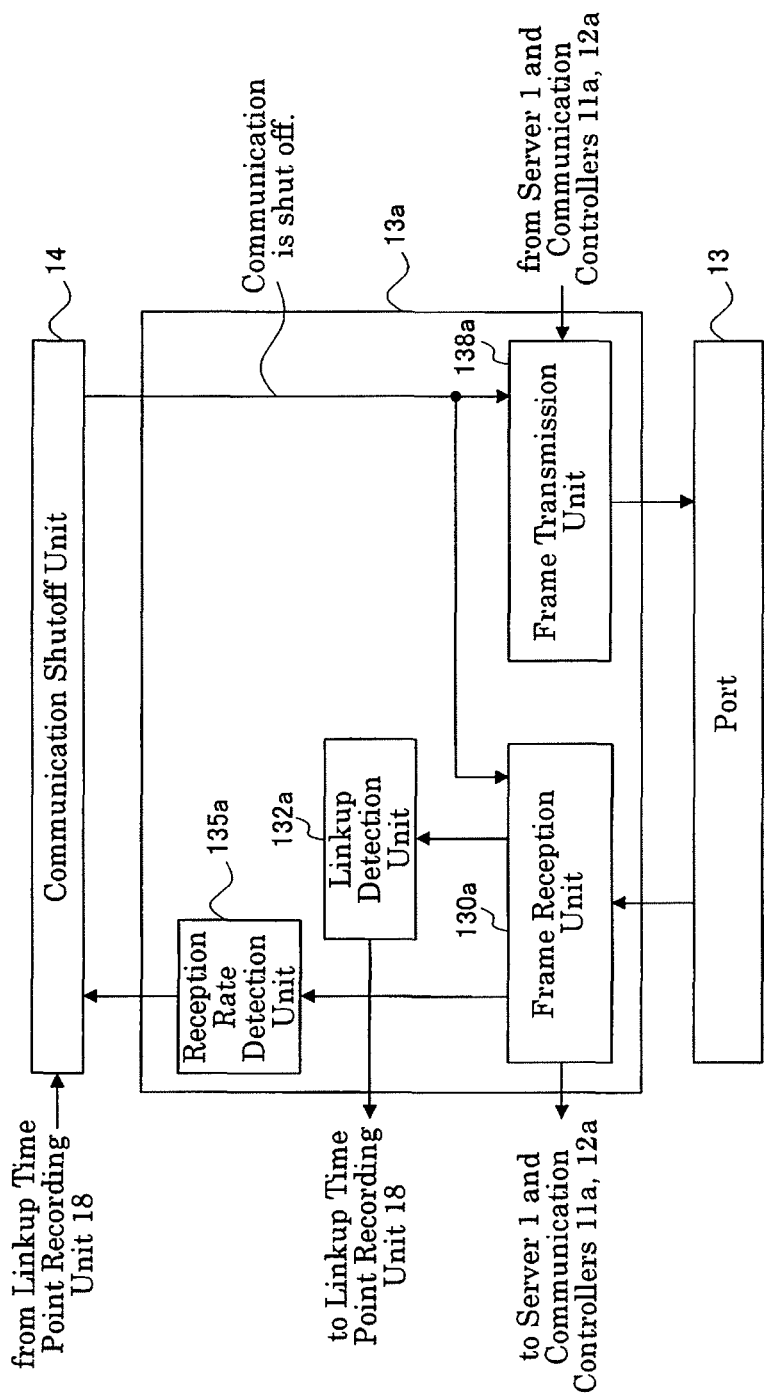
FIG. 13 is a functional block diagram showing the configuration of the communication controller 13a included by the switch 10 according to the second embodiment of the present invention.

FIG. 13 is a functional block diagram showing the configuration of the communication controller 13a included by the switch 10 according to the second embodiment of the present invention.

The communication controller 13a according to the second embodiment includes the frame reception unit 130a, the linkup detection unit 132a, a reception rate detection unit (loop detection unit) 135a, and the frame transmission unit 138a.

The frame reception unit 130a, the linkup detection unit 132a, and the frame transmission unit 138a are the same as those of the first embodiment, and a description thereof is therefore omitted.

The reception rate detection unit (loop detection unit) 135a is the same as the reception rate detection unit 115a, and detects a loop formed by the switch 10 based on the reception rate on the port 13.

The operation of the switch 10 according to the second embodiment is the same as that of the first embodiment (refer to FIGS. 6 and 7), and a description thereof is therefore omitted. It should be noted that the detection of the loop is carried out by the reception rate detection units 115a, 125a, and 135a in place of the loop detection frame detection units 114a, 124a, and 134a of the first embodiment. For example, in the case of FIG. 9, the reception rate detected by the reception rate detection unit 115a or the reception rate detection unit 135a is equal to or more than a predetermined threshold.

The second embodiment also provides the same effects as those of the first embodiment.

It should be noted that the switch 10 according to the second embodiment may include the detection period recording unit 180 in place of the linkup time point recording unit 18 as in the second variation of the first embodiment (refer to FIG. 18).

Third Embodiment

The switch 10 according to a third embodiment is different from the first embodiment in such a point that a change rate of a MAC address of a transmission source of a frame is used to detect the loop.

Figure 14:
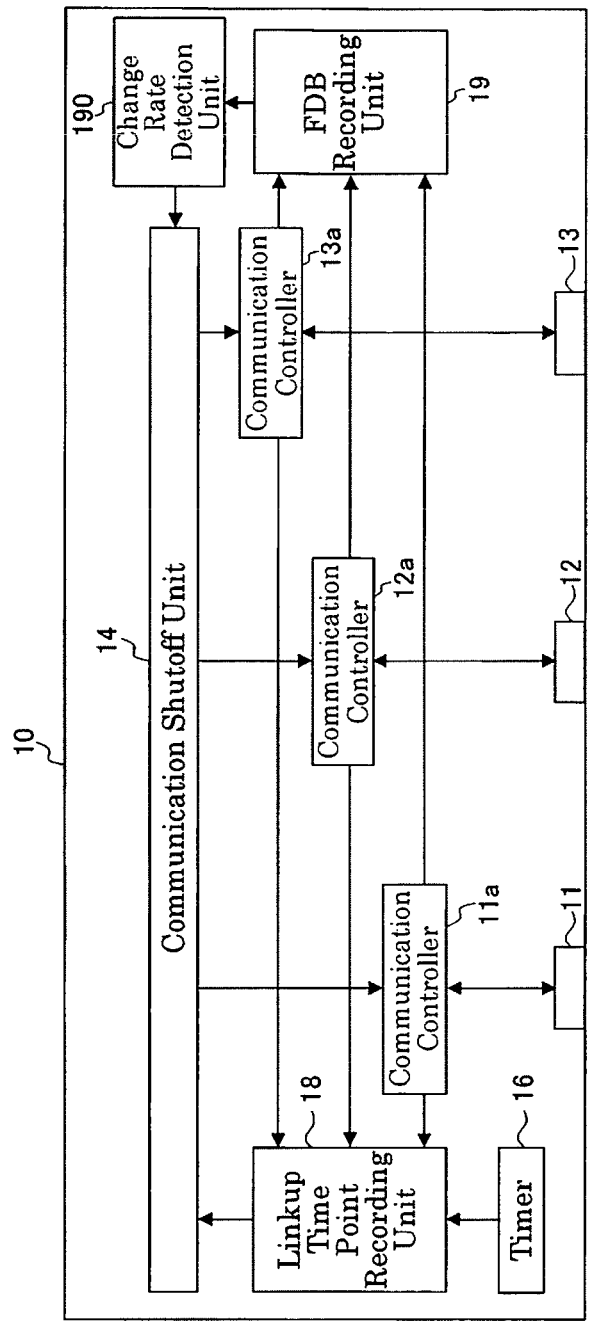
FIG. 14 is a functional block diagram showing the configuration of the switch 10 according to the third embodiment of the present invention.

FIG. 14 is a functional block diagram showing the configuration of the switch 10 according to the third embodiment of the present invention.

The switch 10 according to the third embodiment includes the communication controllers 11a, 12a, and 13a, the communication shutoff unit 14, the timer 16, the linkup time point recording unit 18, an FDB recording unit (address recording unit) 19, and a change rate detection unit (loop detection unit) 190. The communication controllers 11a, 12a, and 13a, the timer 16, and the linkup time point recording unit 18 are the same as those of the first embodiment, and a description thereof is therefore omitted.

The FDB recording unit (address recording unit) 19 records a MAC address of a transmission source of a frame received on the port 11, 12, or 13 while the MAC address is associated with the port 11, 12, or 13 on which the frame was received. It should be noted that the association between the MAC address and the port is referred to as FDB (Forwarding Data Base).

The MAC address of the transmission source is recorded in the frame received on the port 11, 12, or 13. The communication controller 11a, 12a, or 13a reads the MAC address of the transmission source from the frame, and outputs the MAC address to the FDB recording unit 19. As a result, the FDB recording unit 19 can record the MAC address of the transmission source. It should be noted that the port on which the frame has been received is naturally the port 11 if the MAC address of the transmission source is acquired from the communication controller 11a. Similarly, the port on which the frame has been received is naturally the port 12 (13) if the MAC address of the transmission source is acquired from the communication controller 12a (13a).

The change rate detection unit (loop detection unit) 190 detects a loop based on a change rate of recorded contents of the FDB recording unit 19.

For example, a frame from the hub 20 is received on the port 11 if a loop as shown in FIG. 8 is not formed. In this case, the MAC address of the hub 20 is associated with the port 11, and is recorded in the FDB recording unit 19. This recording content is not particularly changed.

On the other hand, for example, if a loop as shown in FIG. 9 is formed, a case in which a frame from the hub 20 is received on the port 11 and a case in which the frame is received on the port 13 are conceivable. In this case, there are a case in which the MAC address of the hub 20 is associated with the port 11, and is recorded in the FDB recording unit 19 and a case in which the MAC address is associated with the port 13, and is recorded in the FDB recording unit 19, and the recorded contents of the FDB recording unit 19 are often changed. As a result, the change rate (number of changes per unit period) of the recorded contents of the FDB recording unit 19 has a large value.

Thus, if the change rate of the recoded contents of the FDB recording unit 19 is equal to or more than a predetermined threshold, the change rate detection unit 190 considers that a loop is generated, and detects the loop.

The communication shutoff unit 14 receives the transmission of the detection of the loop from the change rate detection unit 190, and shuts off the communication.

Figure 15:
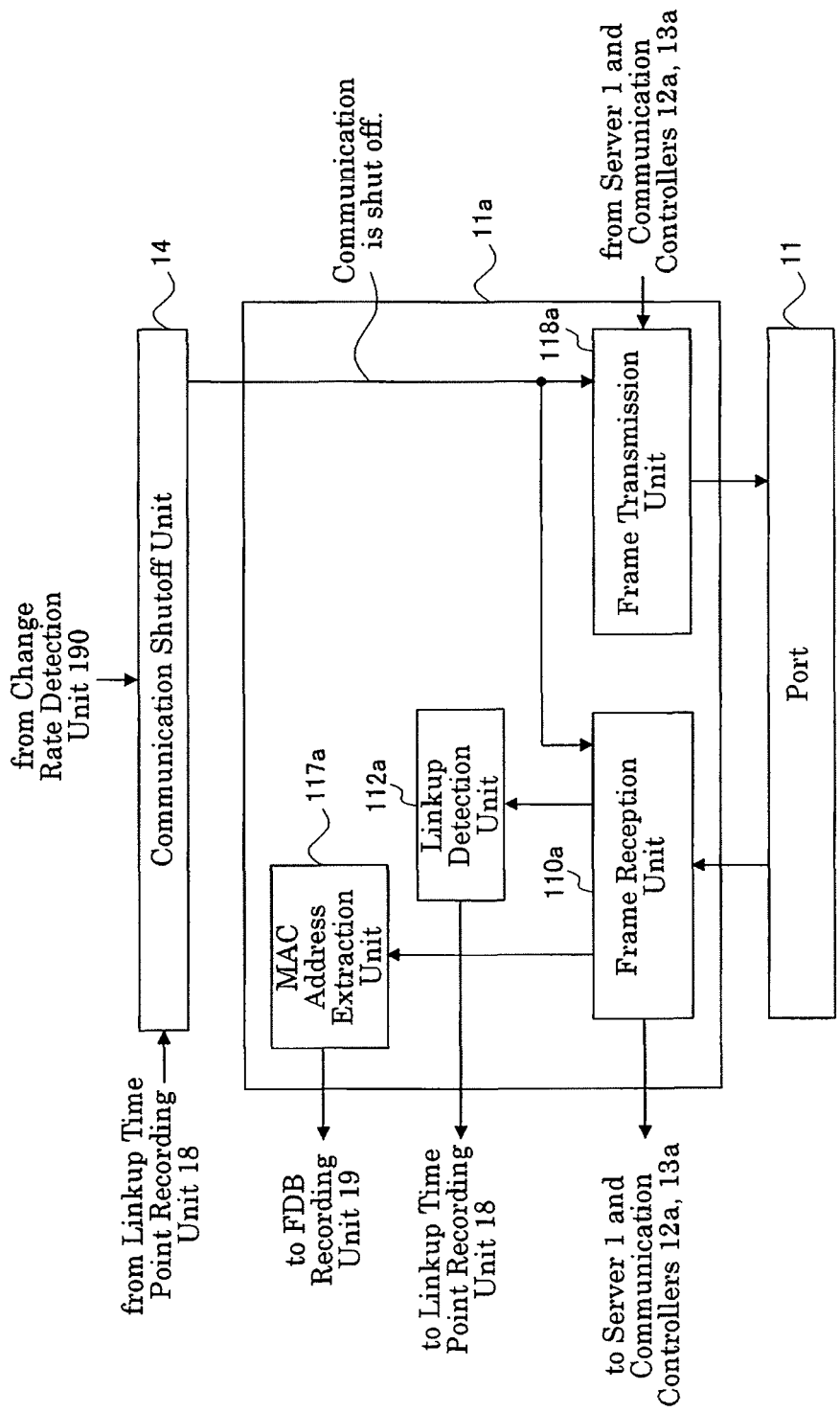
FIG. 15 is a functional block diagram showing the configuration of the communication controller 11a included by the switch 10 according to the third embodiment of the present invention.

FIG. 15 is a functional block diagram showing the configuration of the communication controller 11a included by the switch 10 according to the third embodiment of the present invention.

The communication controller 11a according to the third embodiment includes the frame reception unit 110a, the linkup detection unit 112a, a MAC address extraction unit 117a, and the frame transmission unit 118a.

The frame reception unit 110a, the linkup detection unit 112a, and the frame transmission unit 118a are the same as those of the first embodiment, and a description thereof is therefore omitted.

The MAC address extraction unit 117a obtains a received frame from the frame reception unit 110a, extracts a MAC address of a transmission source from the frame, and outputs the MAC address to the FDB recording unit 19.

Figure 16:
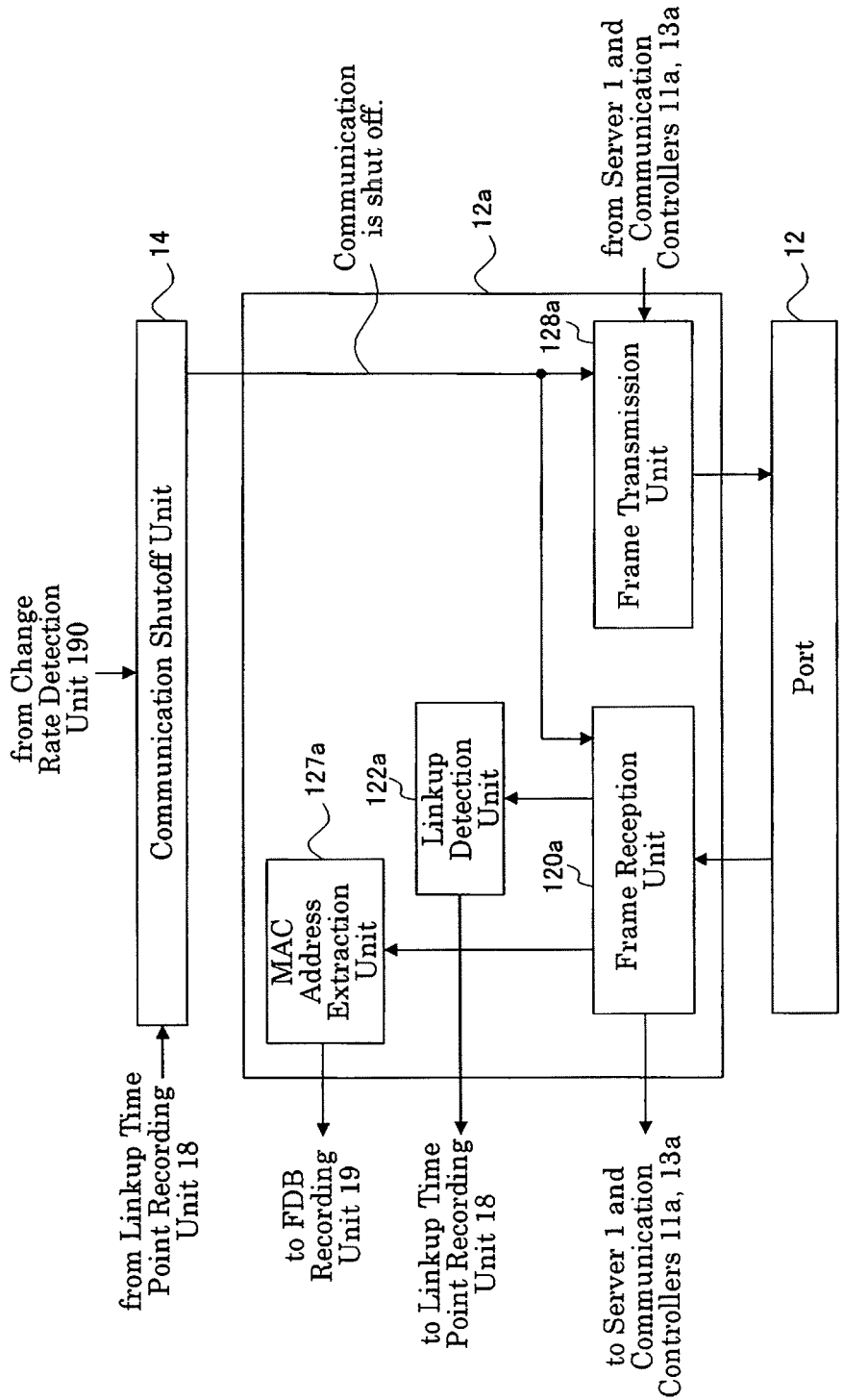
FIG. 16 is a functional block diagram showing the configuration of the communication controller 12a included by the switch 10 according to the third embodiment of the present invention.

FIG. 16 is a functional block diagram showing the configuration of the communication controller 12a included by the switch 10 according to the third embodiment of the present invention.

The communication controller 12a according to the third embodiment includes the frame reception unit 120a, the linkup detection unit 122a, a MAC address extraction unit 127a, and the frame transmission unit 128a.

The frame reception unit 120a, the linkup detection unit 122a, and the frame transmission unit 128a are the same as those of the first embodiment, and a description thereof is therefore omitted.

The MAC address extraction unit 127a obtains a received frame from the frame reception unit 120a, extracts a MAC address of a transmission source from the frame, and outputs the MAC address to the FDB recording unit 19.

Figure 17:
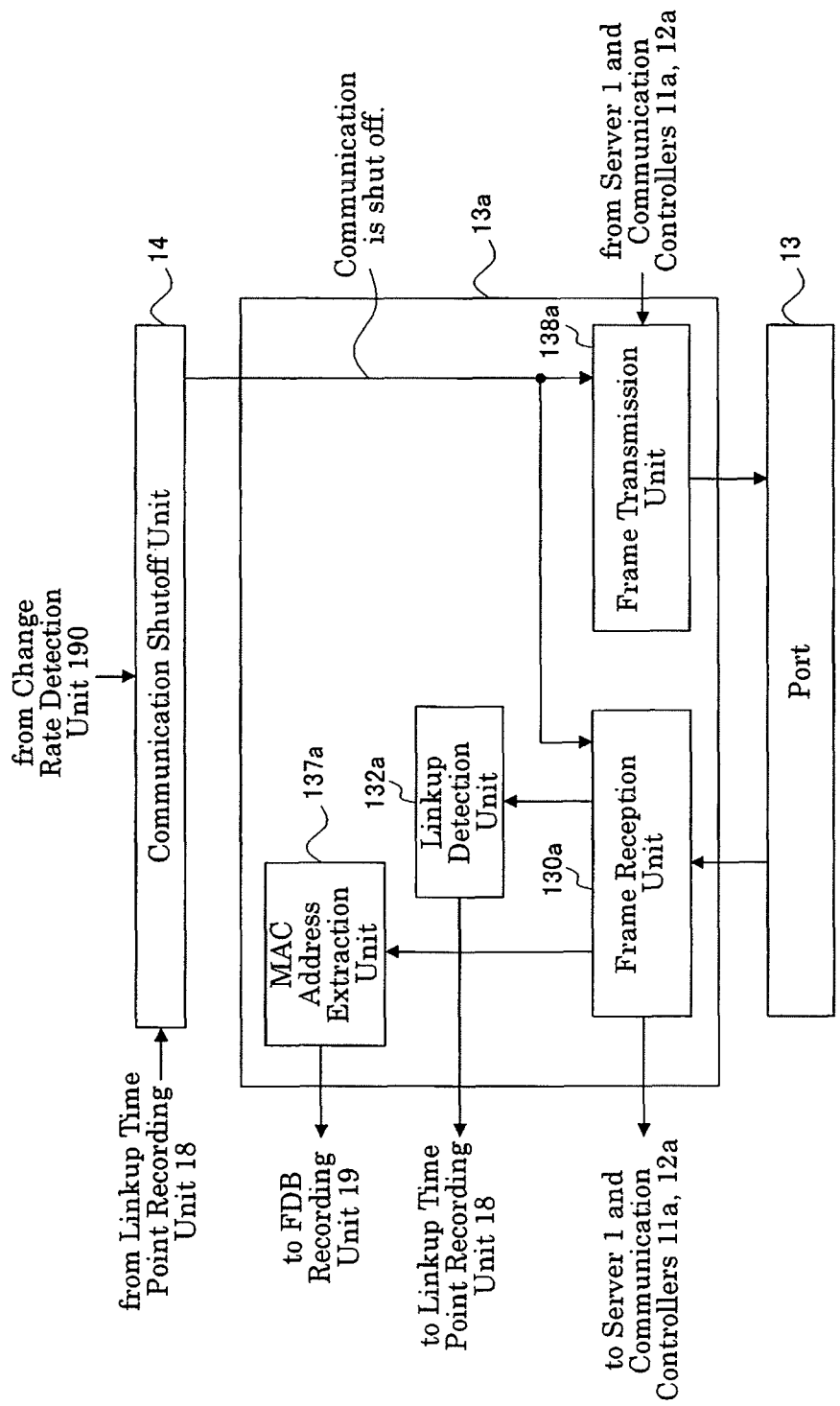
FIG. 17 is a functional block diagram showing the configuration of the communication controller 13a included by the switch 10 according to the third embodiment of the present invention.

FIG. 17 is a functional block diagram showing the configuration of the communication controller 13a included by the switch 10 according to the third embodiment of the present invention.

The communication controller 13a according to the third embodiment includes the frame reception unit 130a, the linkup detection unit 132a, a MAC address extraction unit 137a, and the frame transmission unit 138a.

The frame reception unit 130a, the linkup detection unit 132a, and the frame transmission unit 138a are the same as those of the first embodiment, and a description thereof is therefore omitted.

The MAC address extraction unit 137a obtains a received frame from the frame reception unit 130a, extracts a MAC address of a transmission source from the frame, and outputs the MAC address to the FDB recording unit 19.

The operation of the switch 10 according to the third embodiment is the same as that of the first embodiment (refer to FIGS. 6 and 7), and a description thereof is therefore omitted. It should be noted that the detection of the loop is carried out by the change rate detection unit 190 in place of the loop detection frame detection units 114a, 124a, and 134a of the first embodiment.

The third embodiment also provides the same effects as those of the first embodiment.

It should be noted that the switch 10 according to the third embodiment may include the detection period recording unit 180 in place of the linkup time point recording unit 18 as in the second variation of the first embodiment.

Figure 19:
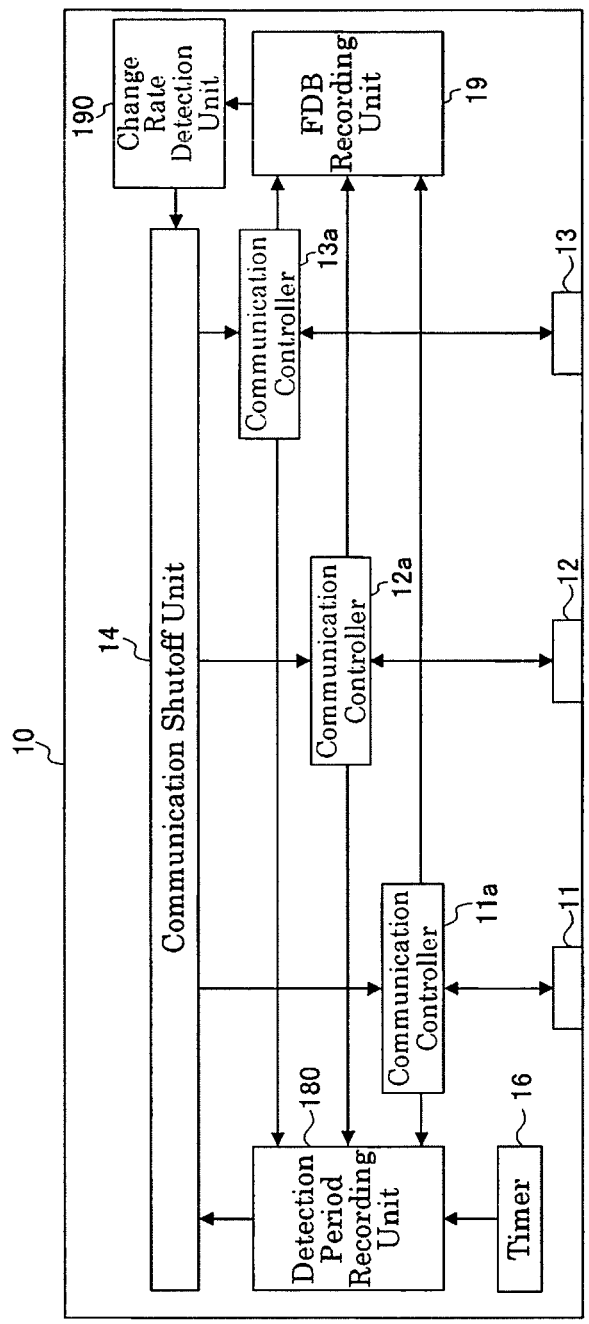
FIG. 19 is a functional block diagram showing the configuration of the switch 10 according to a variation of the third embodiment of the present invention.
Figure 20A:
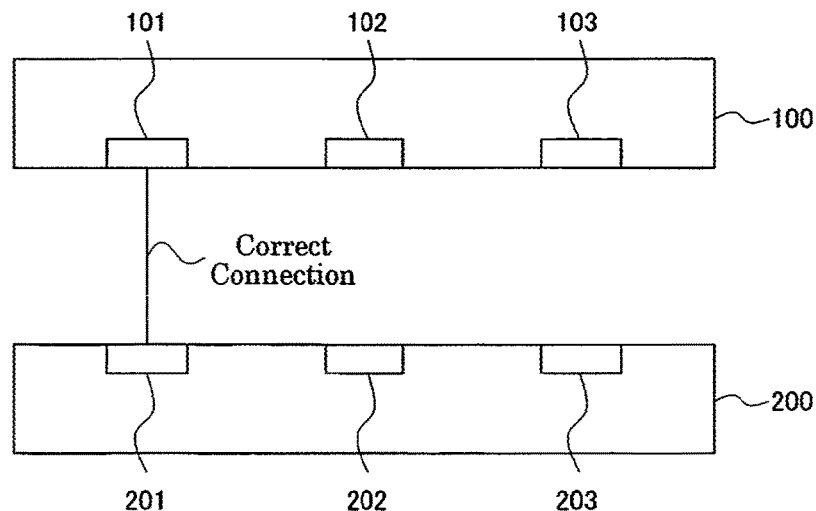
FIGS. 20(a) and 20(b) are diagrams showing an example of a network configuration in which a loop is generated according to prior art, and showing an example (FIG. 20(a)) of the network configuration before a loop is generated and an example (FIG. 20(b)) of the network configuration after the loop is generated.
Figure 20B:
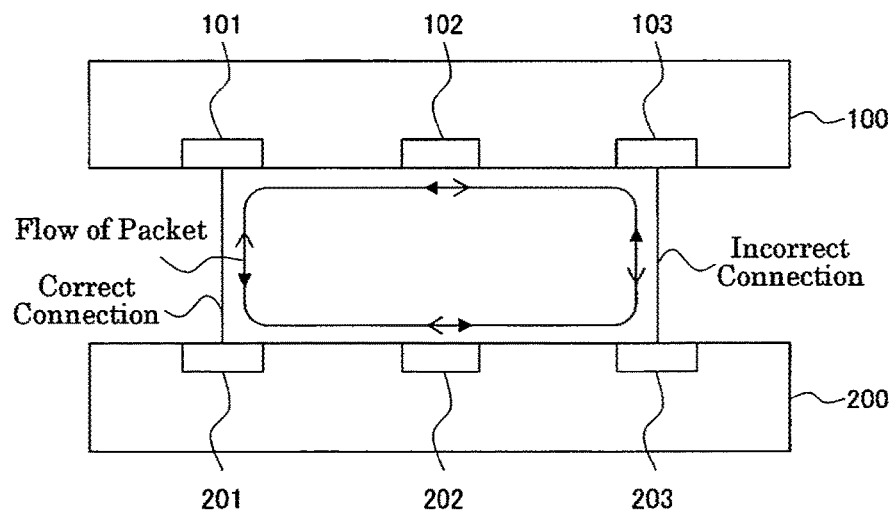
Figure 21A:
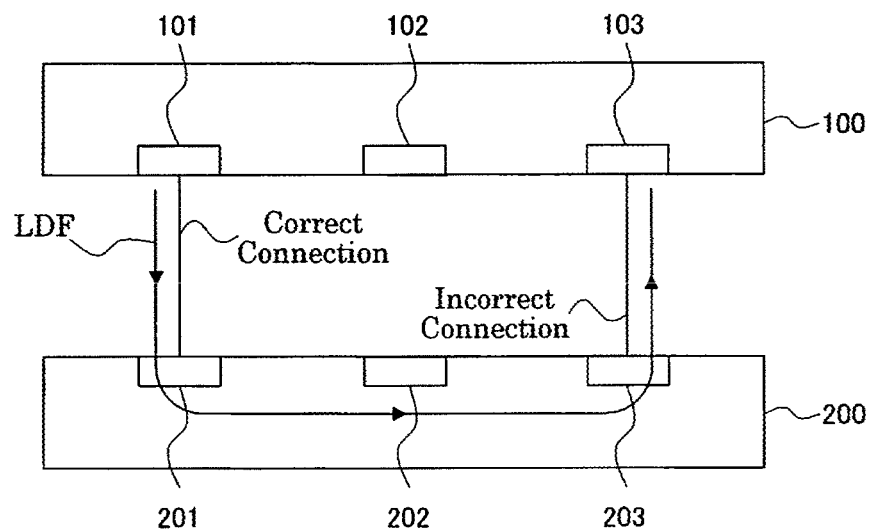
FIGS. 21(a) and 21(b) are diagrams showing a detection principle of a loop by means of the LDF according to prior art, and shows a case in which the LDF is output from the port 101 (FIG. 21(a)), and a case in which the LDF is output from the port 103 (FIG. 21(b)).
Figure 21B:
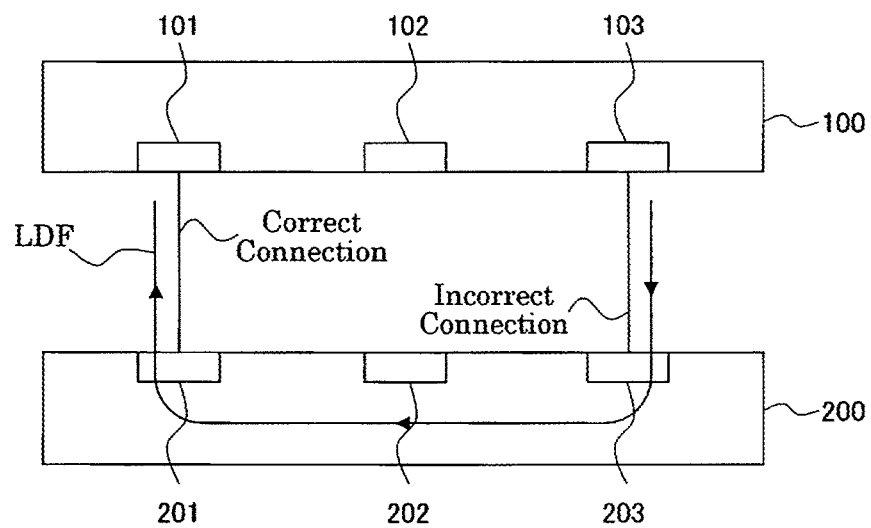

FIG. 19 is a functional block diagram showing the configuration of the switch 10 according to a variation of the third embodiment of the present invention.

The switch 10 according to the variation includes the communication controllers 11a, 12a, and 13a, the communication shutoff unit 14, the timer 16, the FDB recording unit 19, the detection period recording unit 180, and the change rate detection unit 190. The detection period recording unit 180 is the same as that of the second variation of the first embodiment. The other parts are the same as those of the third embodiment.

Moreover, the above-described embodiment may be realized in the following manner. A computer is provided with a CPU, a hard disk, and a media (such as a floppy (registered trade mark) disk and a CD-ROM) reader, and the media reader is caused to read a medium recording a program realizing the above-described respective components such as the respective components of the switch 10, thereby installing the program on the hard disk. This method may also realize the above-described functions.

What is claimed is:

1. A network device including a plurality of ports, comprising:
   a linkup detector that detects a linkup of each port among the plurality of ports;
   a loop detector that detects a loop formed by the network device;

a communication shutoff switch that shuts off communication on a port on which the linkup was detected at a later time point when the loop is detected; and a detection period recorder that records a detection period from the detection of the linkup on the port until the detection of the loop while the detection period is associated with a linkup detected port, which is the port on which the linkup was detected, wherein the communication shutoff switch shuts off the communication on a linkup detected port corresponding to a shorter detection period out of the detection periods recorded in the detection period recorder.

2. The network device according to claim 1, further comprising a linkup time point recorder that records a detection time point of the linkup on the port while the detection time point is associated with a linkup detected port, which is the port on which the linkup was detected, wherein the communication shutoff switch shuts off the communication based on a recorded content of the linkup time point recorder.

3. The network device according to claim 1, further comprising a loop detection frame transmitter that sends out a loop detection frame, wherein the loop detector detects the loop detection frame to detect the loop.

4. The network device according to claim 1, wherein the loop detector detects the loop based on a reception rate on the port.

5. The network device according to claim 1, further comprising an address recorder that records a media access control (MAC) address of a transmission source of a frame received by the port while the MAC address is associated with the port which has received the frame, wherein the loop detector detects the loop based on a change rate of a recorded content of the address recorder.

6. A communication method with using a network device including a plurality of ports, the method comprising:

detecting a linkup of each port among the plurality of ports;

detecting a loop formed by the network device;

shutting off communication on a port on which the linkup was detected at a later time point when the loop is detected; and recording a detection period from the detection of the linkup on the port until the detection of the loop while the detection period is associated with a linkup detected port, which is the port on which the linkup was detected, wherein the communication is shut off on a linkup detected port corresponding to a shorter detection period out of the detection periods recorded.

7. A non-transitory computer-readable medium having a program of instructions for execution by a computer to perform a communication process with using a network device including a plurality of ports, the process comprising:

detecting a linkup of each port among the plurality of ports;

detecting a loop formed by the network device;

shutting off communication on a port on which the linkup was detected at a later time point when the loop is detected; and recording a detection period from the detection of the linkup on the port until the detection of the loop while the detection period is associated with a linkup detected port, which is the port on which the linkup was detected, wherein the communication is shut off on a linkup detected port corresponding to a shorter detection period out of the detection periods recorded.

* * * * *